US012802830B2

(12) United States Patent
Lian

(10) Patent No.: US 12,802,830 B2
(45) Date of Patent: Nov. 17, 2026

(54) OXIDATION AND CORROSION RESISTANT NUCLEAR FUEL

(71) Applicant: RENSSELAER POLYTECHNIC INSTITUTE, Troy, NY (US)

(72) Inventor: Jie Lian, Niskayuna, NY (US)

(73) Assignee: Rensselaer Polytechnic Institute, Troy, NY (US)

( * ) Notice: Subject to any disclaimer, the term of this patent is extended or adjusted under 35 U.S.C. 154(b) by 1180 days.

(21) Appl. No.: 17/629,516

(22) PCT Filed: Jul. 24, 2020

(86) PCT No.: PCT/US2020/043514
§ 371 (c)(1),
(2) Date: Jan. 24, 2022

(87) PCT Pub. No.: WO2021/016566
PCT Pub. Date: Jan. 28, 2021

(65) Prior Publication Data
US 2022/0246315 A1 Aug. 4, 2022

Related U.S. Application Data

(60) Provisional application No. 63/055,991, filed on Jul. 24, 2020, provisional application No. 62/878,480, filed on Jul. 25, 2019.

(51) Int. Cl.
*G21C 3/64* (2006.01)
*B22F 9/04* (2006.01)
*G21C 21/02* (2006.01)

(52) U.S. Cl.
CPC .................. *G21C 3/64* (2013.01); *B22F 9/04* (2013.01); *G21C 21/02* (2013.01); *B22F 2009/043* (2013.01)

(58) Field of Classification Search
None
See application file for complete search history.

(56) References Cited

U.S. PATENT DOCUMENTS 11,145,425 B2 * 10/2021 Lahoda ................. C04B 35/645
2012/0002777 A1 1/2012 Lahoda et al.
(Continued)

FOREIGN PATENT DOCUMENTS

CA 2779079 C 11/2017
CN 107180654 A * 9/2017
(Continued)

OTHER PUBLICATIONS

International Search Report and The Written Opinion of the International Searching Authority, International Application No. PCT/US2020/043514, mailed Nov. 4, 2020.
(Continued)

*Primary Examiner* — Joseph D Anthony
(74) *Attorney, Agent, or Firm* — Barclay Damon LLP; Anthony P. Gangemi

(57) ABSTRACT

One embodiment provides a method of making an oxidation and corrosion resistant nuclear fuel. The method includes refining, by high energy ball milling (HEBM), a nuclear fuel powder comprising at least one nuclear fuel component and sintering the refined powder to form a nuclear fuel pellet. The method may further include adding a powdered dopant to the nuclear fuel powder. The refined powder includes the nuclear fuel powder and the powdered dopant.

13 Claims, 18 Drawing Sheets

(56) References Cited

U.S. PATENT DOCUMENTS

| | | | | |
|---|---|---|---|---|
| 2012/0257707 | A1* | 10/2012 | Ahlfeld .................. | G21C 21/04 264/0.5 |
| 2015/0063524 | A1* | 3/2015 | Yacout .................. | G21C 21/02 427/6 |
| 2015/0152303 | A1 | 6/2015 | Dobbs | |
| 2015/0221398 | A1* | 8/2015 | Subhash ................ | G21C 21/02 264/0.5 |
| 2016/0372221 | A1 | 12/2016 | Harp et al. | |
| 2020/0027578 | A1* | 1/2020 | O'Brien .................. | G21C 3/60 |

FOREIGN PATENT DOCUMENTS

| | | | |
|---|---|---|---|
| CN | 108335760 | A | 7/2018 |
| CN | 108417278 | A | 8/2018 |

OTHER PUBLICATIONS

Bjork, K.I., et al., "Scoping Studies of Dopants for Stabilization of Uranium Nitride Fuel," Nuclear Science and Engineering, vol. 193, pp. 1255-1264, Nov. 2019.

* cited by examiner

OXIDATION AND CORROSION RESISTANT NUCLEAR FUEL

CROSS REFERENCE TO RELATED APPLICATION(S)

This application claims the benefit of U.S. Provisional Application No. 62/878,480, filed Jul. 25, 2019, and U.S. Provisional Application No. 63/055,991, filed Jul. 24, 2020, which are incorporated by reference as if disclosed herein in their entireties.

GOVERNMENT LICENSE RIGHTS

This invention was made with government support under award number NE0008532, awarded by the United States Department of Energy, Office of Nuclear Energy. The government has certain rights in the invention.

FIELD

The present disclosure relates to nuclear fuel, in particular to, oxidation and corrosion resistant nuclear fuel.

BACKGROUND

Accident tolerant fuels (ATFs) are nuclear fuels configured to improve accident tolerance of the fuel-cladding system for light water reactors (LWRs). ATFs may be used in place of uranium dioxide ($UO_2$) and zircaloy. Candidate fuel materials for LWRs include, but are not limited to, triuranium disilicide ($U_3Si_2$), uranium nitride (UN), and uranium carbide (UC). These compounds exhibit relatively higher thermal conductivities and relatively higher uranium loading density compared to that of $UO_2$. Higher uranium density leads to an improved fissionable content and an extended cycle length. Higher thermal conductivity facilitates a relatively better heat release rate and lower working temperature, thus leading to an improved safety margin and enhanced tolerance under accident conditions.

Oxidation resistance and corrosion resistance of nuclear fuels are important factors for fuel performance and accident tolerance. Silicide fuels may experience rapid oxidation and severe corrosion when exposed to water vapor and/or ambient conditions. In a loss of coolant scenario, for example, steam oxidation and air oxidation may occur, leading to the degradation of structural integrity, rapid pulverization and washout of the fuel materials to the primary loop. $U_3Si_2$, for example, is sensitive to oxidation and corrosion under air and steam environments. In air, the oxidation of $U_3Si_2$ occurs at an onset temperature of 384° C., measured by dynamic ramp testing using a thermogravimetric analyzer (TGA). Dynamic oxidation behavior of $U_3Si_2$ is generally tested with thermogravimetric analysis, where the mass of the specimen can be continuously measured, and the onset temperature can be obtained. $U_3Si_2$ pellets pulverize with oxidation to $UO_2$ and $U_3O_8$. The terminal weight gain of $U_3Si_2$ after oxidizing to $U_3O_8$ is 21 wt % and 25 wt % considering the formation of silica. Oxidation of $U_3Si_2$ can occur at temperatures as low as 210 and 350° C. as tested by isothermal annealing. For example, in one study, the oxidation behavior of U-Si compounds was analyzed and the onset temperature of $U_3Si_2$, $U_3Si$, and $U_3Si_5$ was determined to be 384° C., 390° C., and 185° C. respectively.

SUMMARY

In an embodiment, there is provided a method of making an oxidation and corrosion resistant nuclear fuel. The method includes refining, by high energy ball milling (HEBM), a nuclear fuel powder including at least one nuclear fuel component; and sintering the refined powder to form a nuclear fuel pellet.

In some embodiments, the method may further include adding a powdered dopant to the nuclear fuel powder. The refined powder includes the nuclear fuel powder and the powdered dopant.

In some embodiments, the method may further include annealing, by post-sintering thermal annealing, the nuclear fuel pellet.

In some embodiments of the method, the refining includes loading a quantity of the powder and a number of balls into a ball milling jar and performing a number of HEBM cycles. The number of HEBM cycles performed is related to a target size of the refined powder.

In some embodiments of the method, the target grain size of the refined powder is in the range of one micrometer (μm) to 10 μm or in the range of 100 nanometers (nm) to 500 nm.

In some embodiments of the method, the sintering is selected from the group comprising spark plasma sintering (SPS), vacuum sintering, hot pressing, hot isostatic pressing (HIP).

In some embodiments, the sintering corresponds to spark plasma sintering (SPS).

In some embodiments, the nuclear fuel powder comprises Uranium and Silicon as triuranium disilicide ($U_3Si_2$). In some embodiments, the nuclear fuel powder comprises Uranium and Nitrogen as uranium nitride (UN).

In some embodiments, the powdered dopant includes aluminum (Al). An amount of the Al dopant is selected from the group including about 1.8 at. % (atomic percentage), about 7.2 at. %, and in the range of about 7 at. % up to about 25 at. %.

In some embodiments, the powdered dopant includes 3 mol % yttria doped-tetragonal zirconia polycrystal (3Y-TZP) An amount of the 3Y-TZP dopant selected from the group including 1 vol. % 3Y-TZP, 3 vol. % 3Y-TZP, 5 vol. % doping and in the range of about 5 vol. % doping up to about 17 vol. % doping.

In an embodiment, there is provided an oxidation and corrosion resistant nuclear fuel. The nuclear fuel includes a nuclear fuel pellet. The nuclear pellet includes Uranium, and a dopant. An onset temperature of oxidation of the nuclear fuel pellet is greater than 500° C. as measured by thermogravimetric analysis (TGA).

In some embodiments of the nuclear fuel, the nuclear fuel pellet further comprises silicon combined with the Uranium forming triuranium disilicide ($U_3Si_2$). In some embodiments of the nuclear fuel, the nuclear fuel pellet further comprises nitrogen combined with the Uranium forming uranium nitride (UN).

In some embodiments of the nuclear fuel, the dopant is aluminum (Al). In some embodiments of the nuclear fuel, the dopant includes 3 mol % yttria doped-tetragonal zirconia polycrystal (3Y-TZP).

In some embodiments, an amount of the Al dopant is selected from the group including about 1.8 at. % (atomic percentage), about 7.2 at. %, and in the range of about 7 at. % up to about 25 at. %.

In some embodiments, an amount of the 3Y-TZP dopant is selected from the group including 1 vol. % 3Y-TZP, 3 vol. % 3Y-TZP, 5 vol. % doping and in the range of about 5 vol. % doping up to about 17 vol. % doping.

In some embodiments of the nuclear fuel, the nuclear fuel pellet has a density of greater than 95% of a theoretical density. In some embodiments of the nuclear fuel, the nuclear fuel pellet has a grain size in the range of one micrometer (μm) to 10 μm or in the range of 100 nanometers (nm) to 500 nm.

BRIEF DESCRIPTION OF THE DRAWINGS

The drawings show embodiments of the disclosed subject matter for the purpose of illustrating features and advantages of the disclosed subject matter. However, it should be understood that the present application is not limited to the precise arrangements and instrumentalities shown in the drawings, wherein.

DETAILED DESCRIPTION

Figure 1:
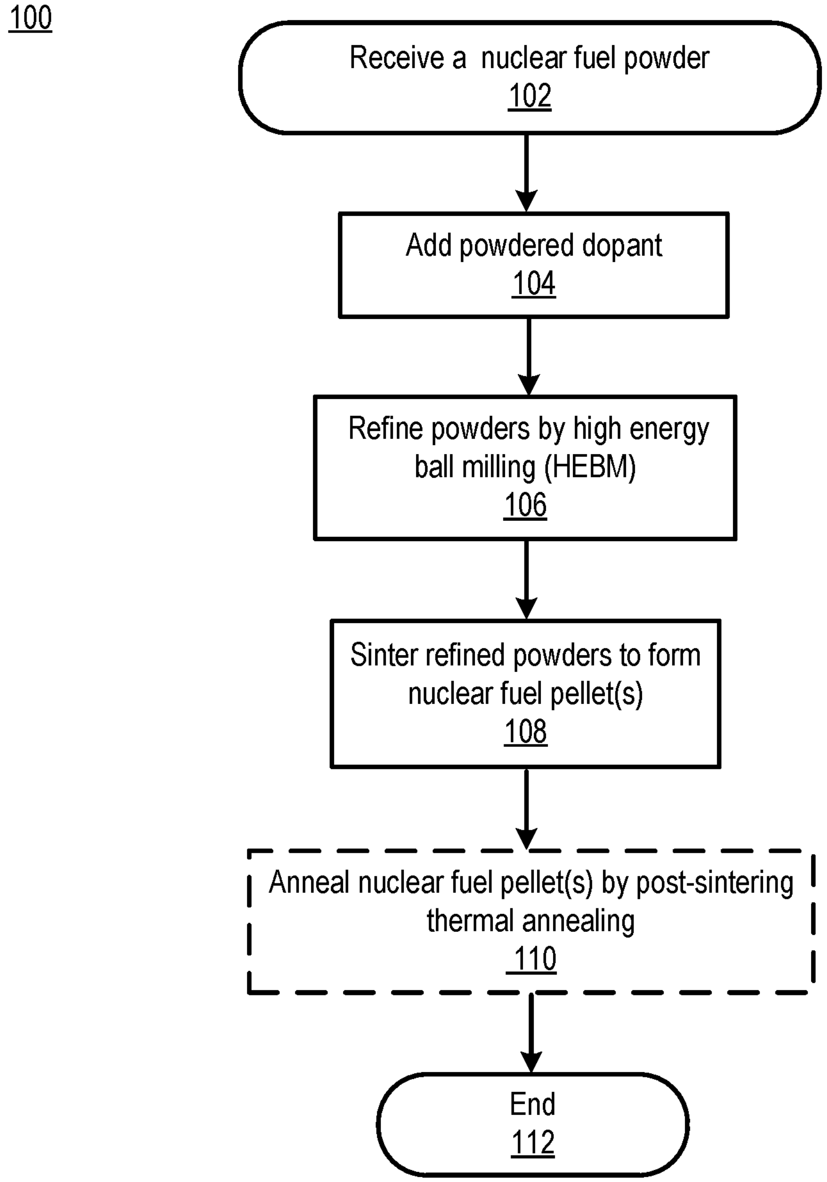
FIG. 1 is a process flow chart of oxidation and corrosion resistant nuclear fuel fabrication operations consistent with several embodiments of the present disclosure.

Generally, this disclosure relates to an oxidation and corrosion resistant nuclear fuel and a method of making. Improvement of oxidation resistance and corrosion resistance nuclear fuels (e.g., $U_3Si_2$, UN) facilitates the use of $U_3Si_2$ and/or UN as accident tolerant fuels. Improvement of oxidation resistance corresponds to an increase the onset temperature of oxidation. Improving oxidation resistance and corrosion resistance may include reducing the kinetics of oxidation and the kinetics of corrosion and increasing the coping time of fuels under accident conditions.

In one embodiment, a fabrication process for a nuclear fuel, including doping, microstructure control and post-thermal annealing process according to various embodiments provides an improved oxidation resistance. For example, a relatively small amount of Al addition (e.g., 1.8 at %) was sufficient to create a protective oxide layer upon post-thermal treatment in air to increase the onset oxidation temperature of fabricated $U_3Si_2$ pellets to greater than 600° C. In one nonlimiting example, Al-doped $U_3Si_2$ pellets were sintered by a powder metallurgy that included high energy ball milling (HEBM) and spark plasma sintering (SPS) consolidation. The Al-doped silicide pellets fabricated, as described herein, exhibit a relatively well-controlled microstructure at micron (micro-) and nano-scales and a relatively uniform distribution of alloy elements. It may be appreciated that other sintering techniques may be used, within the scope of the present disclosure.

In another example, silicide nuclear fuel pellets densified by SPS and having a theoretical density of 95% were synthesized at 1000° C. and 40 MPa for 5 minutes. The grain sizes were determined to be 5.65 μm (microcrystalline) and 280 nm (nanocrystalline). Thermal conductivity was determined based on the measured thermal diffusivity. Microhardness and fracture toughness measurement indicated that the SPS densified $U_3Si_2$ pellets are both relatively mechanically strong and tough as compared with the counterparts sintered by conventional sintering. $U_3Si_2$ pellets, densified as described herein, show enhanced oxidation resistance with enhanced onset temperature of oxidation above 500° C. as measured by TGA analysis. Dense nanocrystalline ("nc-") silicide pellets shows improved oxidation resistance with reduced oxidation kinetics compared to the corresponding microcrystalline ("mc-") counterpart, in which the full oxidation and weight gain of the dense nanocrystalline pellets are completed at temperature beyond 900° C. during dynamic oxidation testing.

In another embodiment, a tetragonal zirconia dopant may be used to toughen a nuclear fuel (e.g., $U_3Si_2$, UN) matrix to improve fracture toughness. The toughened fuel matrix shows better structural integrity and resistance against crack propagation and oxidation. Zirconia forms three different crystal structures depending on temperature: monoclinic, tetragonal, and cubic phases, and a stabilized tetragonal zirconia polycrystal (TZP) such as 3 mol % yttria doped-TZP (3Y-TZP) typically shows superior strength (700 MPa) and toughness (6~7 MPa $m^{1/2}$). The transformation from tetragonal (t) to monoclinic (m) phases under stress leads to the enhancement of strength and fracture toughness. 3Y-TZP toughened $ZrB_2$ displays a maximum composite toughness of 10 MPa $m^{'12}$ with the addition of 30 vol. % 3Y-TZP. Residual tensile stress in the $ZrO_2$ matrix was found to influence the transformation toughness of the composites. Hardness and fracture toughness of 3Y-TZP/$Ti_3SiC_2$ composites increase with the amount of 3Y-TZP and a maximum fracture toughness of 11.94 MPa $m^{1/2}$ can be achieved with 30 vol. % addition.

FIG. 1 is a process flow chart 100 of oxidation and corrosion resistant nuclear fuel fabrication operations consistent with several embodiments of the present disclosure. The process flow chart 100 begins with receiving a nuclear fuel powder that includes at least one nuclear fuel component at operation 102. In one example, the nuclear fuel powder may be a uranium silicide such as triuranium disilicide ($U_3Si_2$). In another example, the nuclear fuel powder may be uranium nitride (UN). The nuclear fuel powder may be produced through powder metallurgy. For example, for $U_3Si_2$ nuclear fuel, the powder metallurgy includes the mixing of uranium and silicon powders with near stoichiometric quantities, arc melting at various currents, thermal annealing at 800° C., and a quick heating up to 1450° C.

A powdered dopant (i.e., additive) may be added to the received nuclear fuel powder at operation 104. In one embodiment, an aluminum (Al) dopant in powder form may doped into (i.e., added to) the nuclear fuel. For example, an amount of the Al dopant may be about 1.8 at. % (atomic (i.e., molar) percentage of dopant). In another example, an amount of the Al dopant may be about 7.2 at. %. In another example, an amount of the Al dopant may be in the range of about 7 at. % up to about 25 at. %. The Al dopant may be added with nuclear fuel component powders during a high energy ball milling (HEBM) process.

In another embodiment, a yttria-tetragonal zirconia polycrystalline (3Y-TZP) additive may be doped into the nuclear fuel powder. For example, an amount of the 3Y-TZP additive may be about 1 vol. % doping (i.e., 1 milliliter (ml) of 3Y-TZP per 100 ml of nuclear fuel powders). In another example, an amount of the 3Y-TZP additive may be about 3 vol. % doping. In another example, an amount of the 3Y-TZP additive may be about 5 vol. % doping. In another example, an amount of the 3Y-TZP additive may be from about 5 vol. % doping up to about 17 vol. % doping. It may be appreciated that $U_3Si_2$ with 3Y-TZP additive 17 vol. % doping may be equivalent to $UO_2$ in terms of fissile element density. It may be further appreciated that for conventional particular-reinforced composite, the doping amount of 3Y-TZP can be up to 30 vol. % to achieve desirable mechanical properties, particularly fracture toughness. Therefore, even up to 17 vol % doping without increasing U density, the composite fuel may display relatively better mechanical properties, which may enhance fuel performance.

The powders may be refined by high energy ball milling (HEBM) at operation 106. The powders include the powdered nuclear fuel components and the powdered dopant. The powdered dopant may be added prior to or during the HEBM process. The HEBM is configured to refine the received powdered nuclear fuel components (and the powdered additive, if present) into smaller particle size HEBM is a mechanochemical process technology generally used for powder mixing and powder refinement for the enhancement of sinterability. HEBM process may be considered a preprocessing technique configured to facilitate subsequent sintering operations. In an embodiment, the HEBM process includes loading a quantity of the powders and a number of balls, each ball having a ball diameter, into a ball milling jar. In one nonlimiting example, the quantity of powders may be 5 grams. In one nonlimiting example, the number of balls may be two and the ball material may be tungsten carbide. For example, the ball diameter may be 8 mm (millimeters). In another example, the ball diameter may be 10 mm. The ball milling jar may correspond to a tungsten carbide (WC) ball milling jar.

In an embodiment, a number of HEBM cycles performed is related to a target size of a resulting milled (i.e., refined) powder. In one example, 4 cycles may be run to produce micro-sized powders. As used herein, micro-sized (i.e., microcrystalline, "mc") powders correspond to powders with a grain structure on the order of 1 micron (i.e., micrometer, μm). In another example, long cycles (e.g., 44 cycles) may be applied to refine the particle size for the synthesis of nano-sized refined powder. As used herein, nano-sized (i.e., nanocrystalline, "nc") powders correspond to powders with a grain structure on the order of 100 nanometers (nm). In one nonlimiting example, the ball milling jar may be spun at about 500 rpm (revolutions per minute). In one nonlimiting example, a duration of the ball milling may be about one hour.

It may be appreciated that $U_3Si_2$ powder will easily ignite in the ambient atmosphere, thus, all of the powder processing and subsequent fuel consolidations were conducted in an environmentally-controlled glovebox with oxygen and moisture levels of less than 1 ppm (part per million).

The refined powders may then be sintered to form nuclear fuel pellet(s) at operation 108. The sintering is configured to densify the refined powders into the nuclear fuel pellet(s). Sintering may include, but is not limited to, spark plasma sintering (SPS), vacuum sintering, hot pressing, hot isostatic pressing (HIP), etc. For example, a sintering apparatus may be connected to the glovebox for sintering operations. In an embodiment, the sintering process may include loading a quantity of the refined powders into a die, applying a sintering pressure to the refined powders in the die and placing the die containing the powders into a sintering chamber. The temperature of the chamber and/or the temperature of the contents of the die may then be raised to a maximum sintering temperature at an sintering temperature rate (i.e., heating rate), held at the maximum sintering temperature for a dwell time period and then the pressure may be released. The pressure may be released rapidly, for example. The specimen may then be allowed to gradually cool down to room temperature.

In one example, 1 gram of ball milled powder (e.g., $Al+U_3Si_2$) may be loaded into a graphite die with a shape of cylinder and a size of 30-mm height and 10-mm inner diameter. A graphite foil may be wrapped at the inner wall of the die and the powder may be surrounded by two foil discs. The foil is configured to facilitate removal after sintering. A graphite felt may be utilized to wrap the die to reduce the heat loss at elevated temperatures. After the preparation, the die-punch assembly may be put into the sintering chamber and pre-pressed by an upper punch of the SPS. Before closing the hatch door, a thermocouple may be inserted into a hole at a side of the die to facilitate measuring and monitoring the temperature. The chamber may then be vacuumed until air pressure is less than $2\times10^{-2}$ torr. A sintering pressure may be applied to the assembly and maintained during the sintering process.

For example, for SPS sintering, the sintering pressure may be about 40 MPa (megapascal). During the SPS process, the temperature may be increased to 1000° C. (degrees Celsius) with a SPS temperature rate (i.e., heating rate) of 100° C./min and then held isothermally at 1000° C. for 5 mins (minutes). Thus, in this example, the maximum sintering temperature is 1000° C., the sintering temperature rate is 100° C./min and the dwell time period is 5 minutes.

The pressure may then be immediately released and the sample (i.e., pellet) allowed to cool down to room temperature gradually. Releasing the pressure immediately is configured to ensure the completeness of the nuclear fuel pellet. After sintering, the nuclear fuel pellet may be moved out of the glovebox and may then be ground and polished. In one nonlimiting example, the grinding and polishing may be performed using silicon carbide papers and diamond paste. The physical density may then be measured using Archimedes' method. The rule of mixture (ROM) for each composition may be used to determine the theoretical density of the composite. For the examples described herein, sintered pellets had a density about 95% TD (theoretical density).

In another example, a powder mixture (e.g., 3Y-TZP+ $U_3Si_2$) may be consolidated into dense composite fuel pellets by sintering. For example for SPS sintering, the sintering pressure is 50 MPa, the maximum sintering temperature is 1300° C., the sintering temperature rate is 100° C./min and the hold time period is 5 minutes. The densities of the SPS-sintered pellets corresponding to this example powder mixture exhibited a density (measured using an Archimedes method) of greater than 96% of the theoretical density.

In some embodiments, the fuel pellet(s) may be annealed by post-sintering annealing at operation 110. For example, post sintering thermal annealing may be performed in a furnace in air at a range of annealing temperatures and a range of annealing times. In an embodiment, the range of annealing temperatures may be from about 300° C. to about 600° C. In an embodiment, the range of annealing times may be from about 1 hour to about 3 hours. In one nonlimiting example, for Al+$U_3Si_2$ fuel pellets, the annealing temperature may be 300° C. and the annealing time may be 2 hours. In another nonlimiting example, for 3Y-TZP+$U_3Si_2$ fuel pellets, the annealing temperature may be 300° C. and the annealing time may be 2 hours.

The process flow may then end at operation 112.

Densified Al-doped nuclear fuel (e.g., $U_3Si_2$ and/or UN) pellets, according to various embodiments, may exhibit improved thermal-mechanical properties and relatively high oxidation resistance. As an example, both micron- and nano-sized $U_3Si_2$ pellets with different Al additives were fabricated, as described herein, and a uniform distribution of Al metal additives in the fuel matrix was achieved. It may be appreciated that a complex phase behavior and elemental redistribution may occur as a result of interaction between Al additive and $U_3Si_2$ matrix, and binary U-Al and ternary U-Al—Si phases were observed. The densified Al-doped pellets show improved oxidation resistance in air with an onset temperature generally above 550° C. Isothermal annealing was performed to form an oxide scale to further improve the oxidation resistance. The annealed 1.8 at % Al-doped nc-$U_3Si_2$ shows the highest onset temperature for oxidation above 600° C., which might be attributed to the enhanced Al migration in dense nano-sized pellets and thus easy formation of oxide scales. The oxidation resistance of the densified Al-doped pellets with minimal Al additive is further complemented with simultaneously-high strength and fracture toughness, beneficial for improving fuel performance.

In another embodiment, dense nuclear fuel (e.g., $U_3Si_2$ and/or UN) doped with 3Y-TZP and synthesized by sintering, may exhibit enhanced fracture toughness and oxidation resistance. For example, dense $U_3Si_2$ composites doped with 3Y-TZP and synthesized by spark plasma sintering, showed enhanced fracture toughness and oxidation resistance. With increasing 3Y-TZP content in $U_3Si_2$ and a tetragonal to monoclinic $ZrO_2$ phase transformation-induced toughening mechanism, a fracture toughness up to 4.04 $MPa^{\prime 12}$ can be achieved for the composite with 5 vol. % 3Y-TZP. The onset oxidation temperature of the densified 3Y-TZP/$U_3Si_2$ was 560° C. A post sintering thermal annealing can further delay the onset temperature of the 3 vol. % 3Y-TZP composite to 617° C. It is contemplated that a continuous $ZrO_2$ oxide scale distributed in the grain structure may suppress oxygen diffusion and improve the oxidation resistance of $U_3Si_2$ fuels. The enhanced fracture toughness in 3Y-TZP toughened silicide fuel matrix improves the structural integrity of the fuel pellet against oxidation-induced pulverization and thus improves the oxidation/corrosion resistance. The addition of 3Y-TZP may facilitate the development of advanced uranium silicide fuels with improved fracture toughness and oxidation resistance with maintained high fissile element density.

Experimental Data

X-ray diffraction (XRD) patterns of each nuclear fuel pellet were acquired through a Panalytical X'Pert XRD system (Westborough, MA, USA) with Cu $K_\alpha$ irradiation and a wavelength of 1.5406 Å. The scanning range was 20°-80° and the scanning step was 0.05° with a scanning rate of 2 second/step. For example, the phase composition of the SPS-densified Al-doped $U_3Si_2$ pellets was characterized by X-ray diffraction (XRD) using the Panalytical X'Pert XRD system. The lattice constants were then determined from the position of measured XRD peaking patterns.

Grain size and sample morphology were determined through SEM images taken from a Carl Zeiss Supra 55 (Jana, Germany) field-emission scanning electron microscope (SEM). Energy-dispersive X-ray elemental analysis was performed along with SEM using an Energy-dispersive X-ray spectrometer (Oxford, UK). The average grain size and the associated standard deviation were measured using a rectangular intercept method according to ASTM E122-88 standard (1992). Prior to taking SEM images, the sample was chemical etched with the combination of acetic acid and nitric acid, with a ratio of 7:3.

The microstructures of the as-prepared specimens and after thermal annealing were observed by an SEM-equipped with a Robinson Backscattered detector (RBSD) and an energy dispersive spectroscopy (EDS) system. The chemical compositions of the specimens were analyzed using the SEM equipped with EDS using an Oxford INCA detector (Oxford, UK). Transmission electron microscopy (TEM) specimens were prepared using a focused ion beam technique (FIB). A 300 kV accelerating voltage was applied for conducting TEM. Selected area electron diffraction (SAED) patterns were collected and dark field TEM images were acquired using high angle annular dark filed (HAADF) detectors.

Thermal diffusivity of the sintered $U_3Si_2$ pellets were measured with a laser flash apparatus (LFA-457, NETZCH, Bavaria, Germany). Cylindrical specimens with a 10 mm diameter and a 2-3 mm height were manufactured and each weighted ~1 gram. Prior to the measurement, all samples were coated with spray graphite on both sides to control emissivity. After loading the sample, the chamber of the apparatus was vacuumed three times and ultra-high purity (UHP) Ar was used as the atmosphere during the measurement. Thermal diffusivity was measured in the range of 300 to 1000 K with an interval of 50 K. The heating rate was 5° C./min and the measurements were started only after the thermal stability is reached. At each temperature, 3 to 10 data points were collected, and the average value was taken. The data obtained was then fitted using the Cape-Lehman model. Thermal conductivity was subsequently calculated from the density, specific heat capacity, and measured thermal diffusivity. Cape-Lehman with a pulse correction model that uses non-linear regression was used to evaluate the thermal diffusivity.

Thermogravimetric analysis (TGA) ramp testing was conducted using a simultaneous DSC/TGA system (SDT650, TA instrument, DE, USA). TGA ramp testing is a thermal analysis method that measures the mass change and heat flow when the temperature of the specimen changes. Thermogravimetric analysis was used to monitor the oxidation behavior of the $U_3Si_2$ specimen and to determine the onset temperature and weight gain during oxidation. The apparatus (thermocouple) was thermally calibrated with melting point of Zinc prior to the measurements. About 20 to 30 mg of specimen was loaded into an aluminum oxide ($Al_2O_3$) crucible with a lid, which can prevent possible mass loss during oxidation process. The sample was heated up to 1000° C. with a heating rate of 10° C./min in air, during which heat flow and mass (weight) change was continuously measured and recorded. For isothermal annealing, the temperature was maintained at 300° C. (which is lower than the onset temperature for both specimens), for 120 minutes and then increased to 1000° C. After temperature reached 1000° C., the chamber was cooled down gradually to room temperature. In one example, the onset temperature of the oxidation was taken as the transition point of the heat flow curve. Time to completion was defined as the time from oxidation onset to the full oxidation of the specimen. Full oxidation is indicated when weight becomes constant. In another example, the onset temperature, and mass gain (terminal oxidation) were quantified by the Proteus software, allowing the determination of the oxidation behavior of the Al-doped pellets.

Mechanical properties of the SPS-densified pellets (hardness and fracture toughness) were measured using a microhardness tester (LECO, M-400, USA) at 25° C. under a load of 9.8 N. A dwell time of 15 seconds was applied, and indents were placed at 8 to 10 positions. The indentation and corresponding fractures were observed using SEM. The fracture toughness values can be evaluated from the cracks generated by the indentation test. Microhardness may be calculated according to equation (1), where a is the average diagonal length of the indentation and P is the load. Fracture toughness was measured according to equation (2), where δ is a parameter related to the indenter and was taken as 0.016. E and H are Young's modulus and hardness of the material, respectively. P is load and C is average crack length.

$$H = 1.854\frac{P}{a^2} \quad (1)$$

$$K_{IC} = \delta\left(\frac{E}{H}\right)^{0.5}\left(\frac{P}{C^{1.5}}\right) \quad (2)$$

Thermal diffusivity of mc- and nc-pellets was measured with LFA in the temperature range of 300 K to 1000 K. The corresponding thermal conductivity k was determined based on equation (3), where α is thermal diffusivity, ρ is density, and $c_p$ is specific heat capacity. The temperate-dependent density was determined according to equation (4). Temperature-dependent specific heat capacity was determined according to equation (5).

$$k = \alpha\rho c_p \quad (3)$$

$$\rho = \frac{\rho_0}{[1 + \alpha_p(T - T_0)]^3} \quad (4)$$

$$C_p = 140.5 + 0.02582 \cdot T \quad (5)$$

Figure 2A:
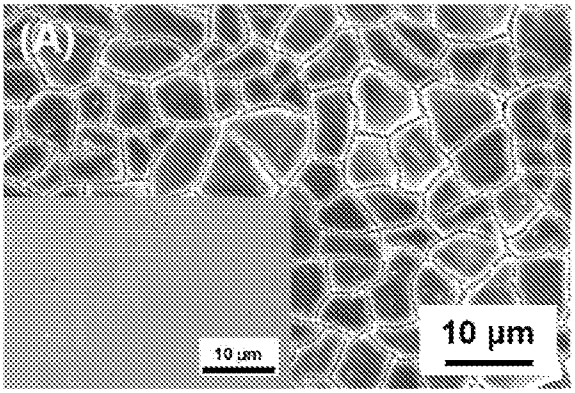
FIGS. 2A through 2D illustrate SEM images and EDS scan result of the SPS densified mc- and nc-$U_3Si_2$ pellets ("SPS-sintered mc- and nc-specimens")
Figure 2B:
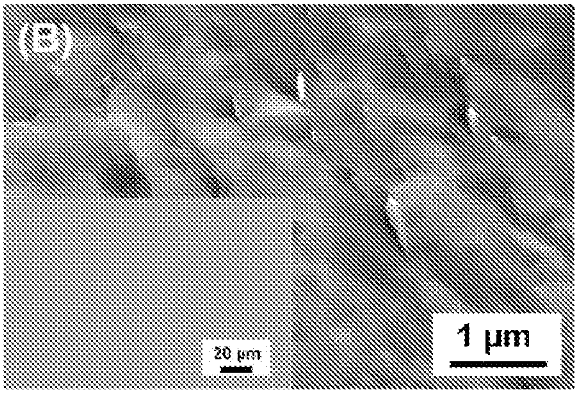
Figure 2C:
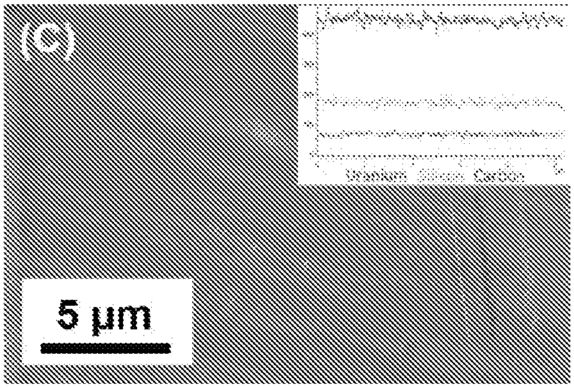
Figure 2D:
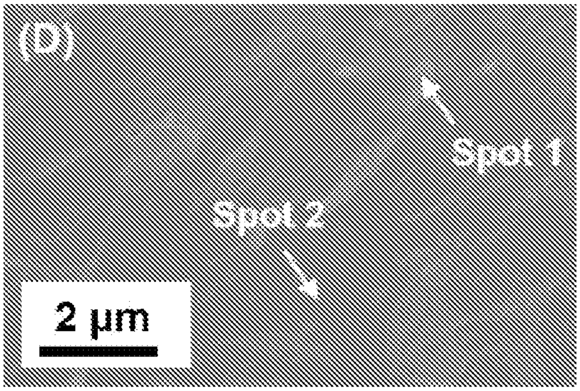

FIGS. 2A through 2D illustrate SEM images and EDS scan result of the SPS densified mc- and nc-$U_3Si_2$ pellets ("SPS-sintered mc- and nc-specimens"). The SEM images show uniformity in phase and composites, indicating that these SPS sintered samples are relatively dense and relatively uniform. FIG. 2A is the SEM image of a microcrystalline sample with grain size of ~5.65 μm. FIG. 2B is the SEM image of a nano-crystalline sample with grain size of ~280 nm. FIGS. 2C and 2D illustrate an EDS line scan and spot scan, respectively, suggesting that the atomic ratio of uranium and silicide is very close to 3:2, which supports that the sintered samples are pure $U_3Si_2$. It can be seen from the polished surface that both specimens are dense and uniform. The specimen of FIG. 2A was chemical etched, which reflected the grain size of the mc-specimen being ~5.65 μm. FIG. 2B illustrates the fracture surface of the nanocrystalline sample and the grain size is determined to be ~280 nm. FIG. 2C shows line scan on the mc-specimen surface and FIG. 2D shows spot scan on two points. EDS results on both samples indicate that the atomic ratio between U and Si is very close to 3:2, which suggests that the specimens sintered with SPS is pure $U_3Si_2$. No chemical heterogeneity or obvious secondary phases are identified from the SPS densified $U_3Si_2$ pellets. The enhanced microstructure and chemical composition uniformity can be attributed to the mechanical attrition during the powder processing, and the Si-enriched phase induced by arc melting may be dispersed into the $U_3Si_2$ matrix, leading to an improved microchemical homogeneity of the sintered pellets.

Figure 3A:
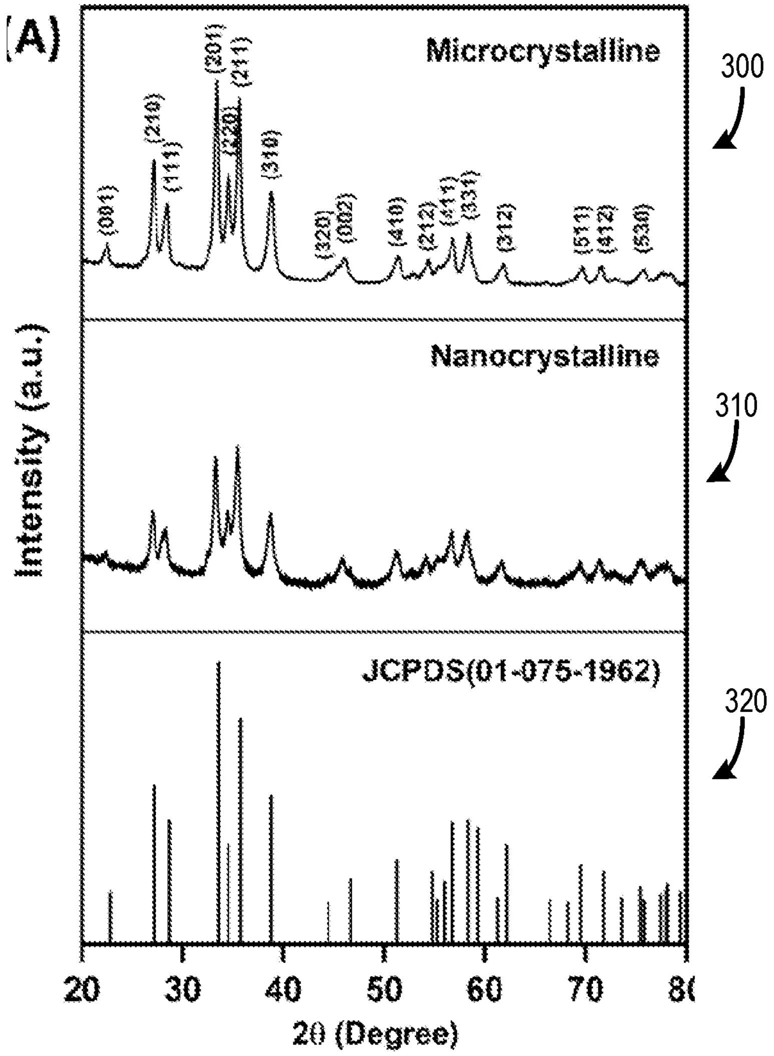
FIGS. 3A through 3C illustrate XRD spectra and Rietveld refinement of microcrystalline and nanocrystalline samples.
Figure 3B:
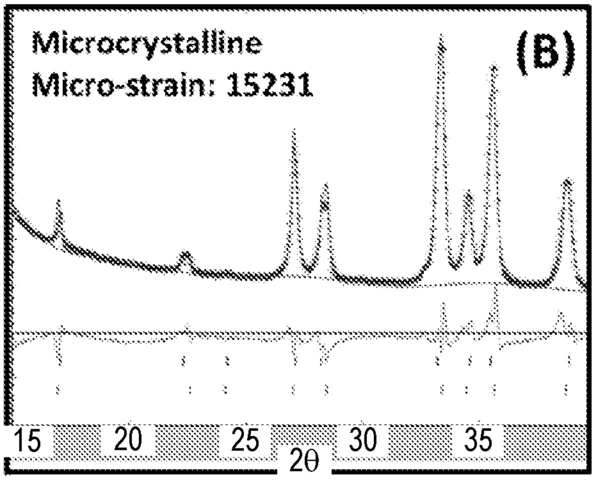
Figure 3C:
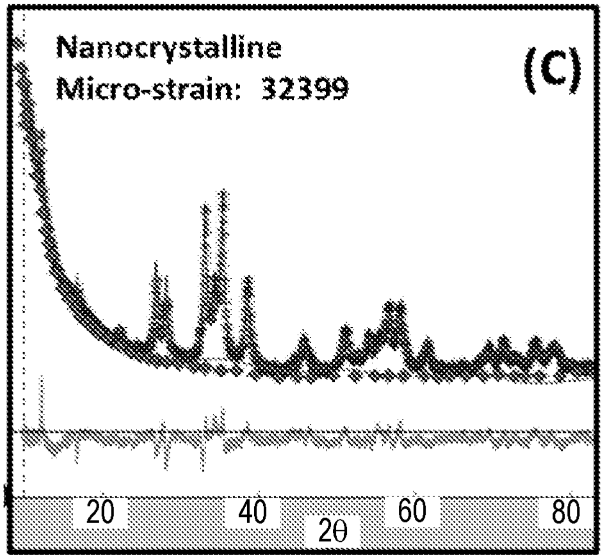

FIGS. 3A through 3C illustrate XRD spectra and Rietveld refinement of microcrystalline and nanocrystalline samples. FIG. 3A illustrates the XRD spectra of the microcrystalline samples 300, nanocrystalline 310 samples and the JCPDS card 320. It may be appreciated that the diffraction peaks of XRD spectra 300, 310 correspond to the JCPDS card (07-015-1962) for normal silicide 320. FIG. 3B illustrates the Rietveld refinement of microcrystalline pellets and FIG. 3C illustrates the Rietveld refinement of nanocrystalline pellets. The Rietveld refinement illustrate two phases (normal and distorted phases) showing dominant distorted phase upon SPS consolidation and residual thermal stress upon thermal contraction during rapid cooling process.

Figure 4A:
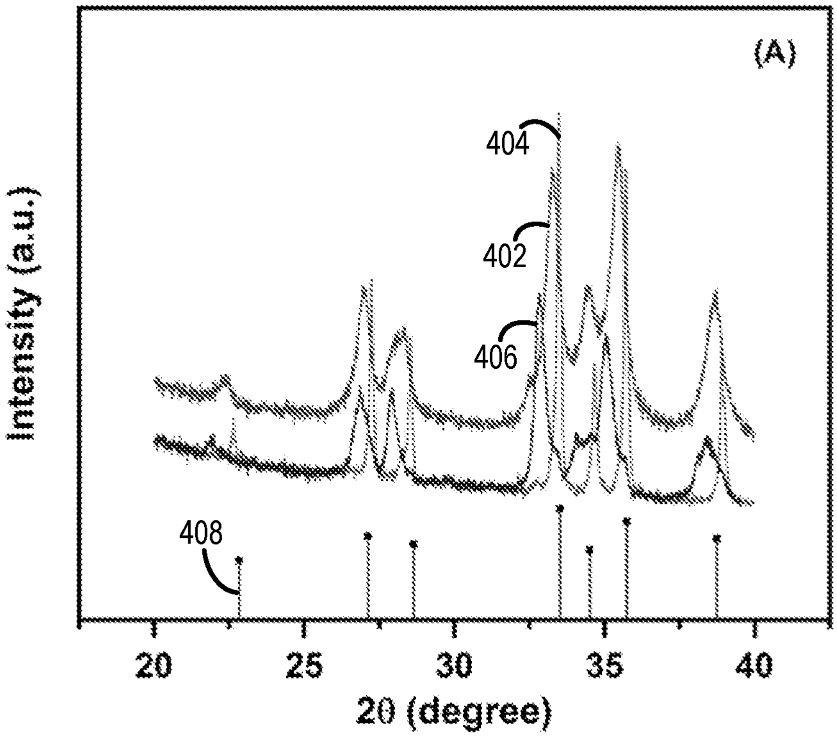
FIG. 4A illustrates XRD patterns for as-sintered samples and FIG. 4B illustrates isothermal annealed samples.
Figure 4B:
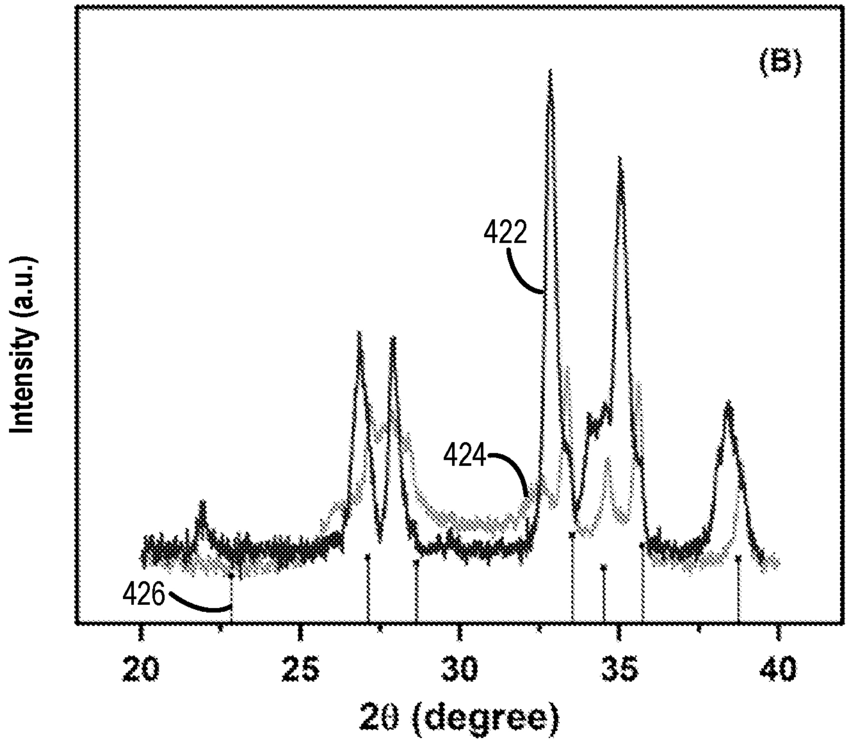

A close-up view of XRD diffraction pattern (as shown in FIGS. 3B, 4A and 4B) in the range of 20 to 40 degrees for as-sintered pellets indicates a constant peak shift to a smaller-angle (about 0.5° to 0.6°) compared to the peaks in the JCPDS card, suggesting lattice expansion from the normal $U_3Si_2$ phase. Peak splitting was observed, suggesting the existence of a second set of diffraction. Rietveld refinement (FIG. 3B) of the x-ray diffraction indicates that the dominated phase (99.3%) is a distorted uranium silicide, and the lattice parameters of the defect structure are: a=0.741 nm and c=0.402 nm, greater than that of the normal $U_3Si_2$ phase (a=0.730 nm and c=0.392 nm). The minor phase is the normal $U_3Si_2$ phase which can be indexed well by the JCPDS card shown as vertical line in FIG. 4A. The peak shift and the distorted silicide phase were also observed in the dense nano-sized pellets, and the lattice constants are determined as: a=0.733 nm and c=0.394 nm. Along with the structural distortion, residual micro-strain was also obtained in the SPS densified pellets through Rietveld refinement, and the nc-pellet shows larger micro-strain than the mc-pellet.

FIG. 4A illustrates XRD patterns for as-sintered samples and FIG. 4B illustrates isothermal annealed samples. FIG. 4A includes XRD patterns for nano $U_3Si_2$ pellets 402 (100% defect $U_3Si_2$, defect $U_3Si_2$: a=0.733 nm, c=0.394 nm), micro $U_3Si_2$ pellets in powder form 404 (100% $U_3Si_2$, $U_3Si_2$: a=0.730 nm, c=0.392 nm), micro $U_3Si_2$ pellets 406 (99.3% defect $U_3Si_2$+0.7% $U_3Si_2$, defect $U_3Si_2$: a=0.741 nm, c=0.402 nm, $U_3Si_2$: a=0.730 nm, c=0.392 nm), and JCPDS (01-075-1962) 408. FIG. 4B includes XRD patterns for micro $U_3Si_2$ pellet 422, annealed 424 and JCPDS (01-075-1962) 426. In both FIG. 4A and FIG. 4B, the JCPDS card is shown in droplines 408, 426. Two sets of peaks were observed for the as-sintered specimen, one of which has a constant shifting to the other and vanishes after thermal annealing (FIG. 4B), indicating that the as-sintered specimen may have residual strain.

Figure 5:
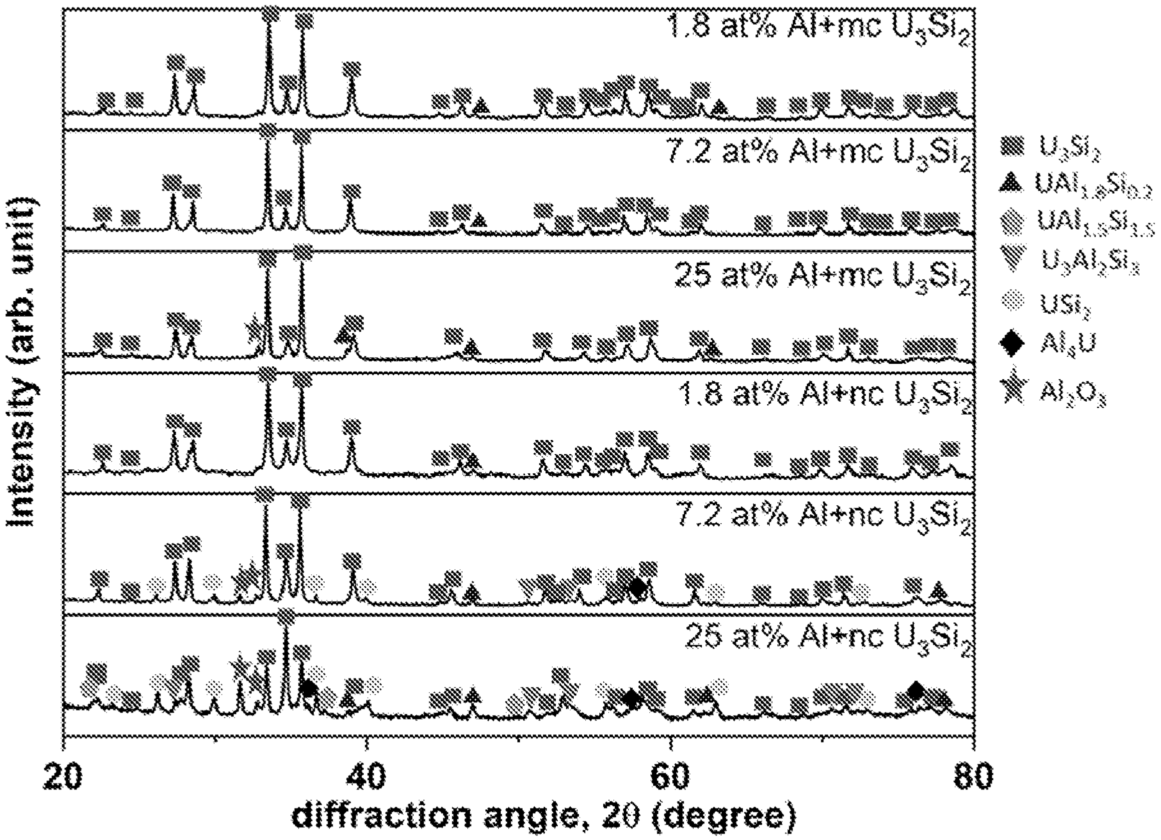
FIG. 5 illustrates XRD patterns of the as-prepared Al-doped specimens with different doping amounts and microstructure controls.

FIG. 5 illustrates XRD patterns of the as-prepared Al-doped specimens with different doping amounts and microstructure controls. The 1.8 at % and 7.2 at % Al doped mc-$U_3Si_2$ pellets show the major phase corresponding to a tetragonal $U_3Si_2$ (P4/mbm-127). Ternary phases including cubic $U(AlSi)_{1.5}$ (Pm/3m-221), cubic $UAl_{1.8}Si_{0.2}$(Fd-3m-227) and tetragonal $U_3Al_2Si_3$ (I4/mcm-140) can be seen. The formation of $U_3Al_2Si_3$ phases are relatively more clear from the 25 at % doped nc-$U_3Si_2$, as the main peaks of $U_3Al_2Si_3$ are almost overlap with $U_3Si_2$ peaks at ~27.4°. The main peak at 38.6° for Al-doped nc-$U_3Si_2$, correspond to Al rich compound of $UAl_{1.8}Si_{0.2}$. 25 at % nc-$U_3Si_2$ exhibit the formation of $U(AlSi)_{1.5}$ phase where the main peak is at 21.4°. Impurity phases can be seen for higher Al doped pellets to 7.2 at % and 25 at % Al such as orthorhombic $Al_4U$ (Imma-74), and hexagonal $USi_2$ (P6/mmm-191). The formation of $Al_4U$ is also observed as shown by a diffraction peak at 2θ=35.8° for the high Al doping sample.

Figure 6A:
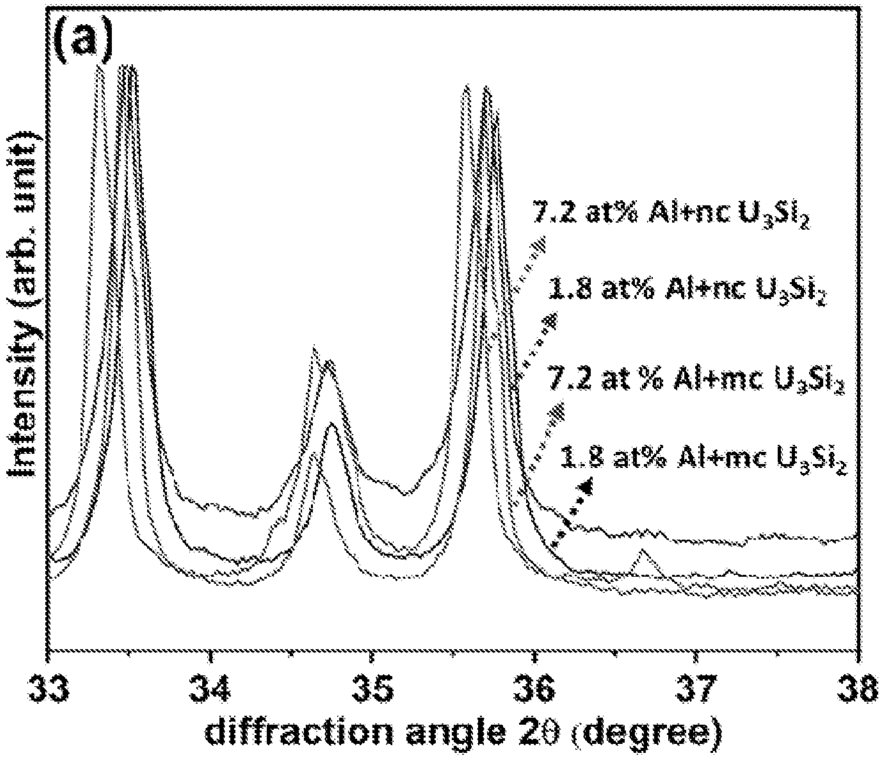
FIG. 6A illustrates XRD patterns of the SPS densified Al-doped (1.8 at. % and 7.2 at. %) mc- and nc-$U_3Si_2$ pellets within diffraction angle 33~38 degrees
Figure 6B:
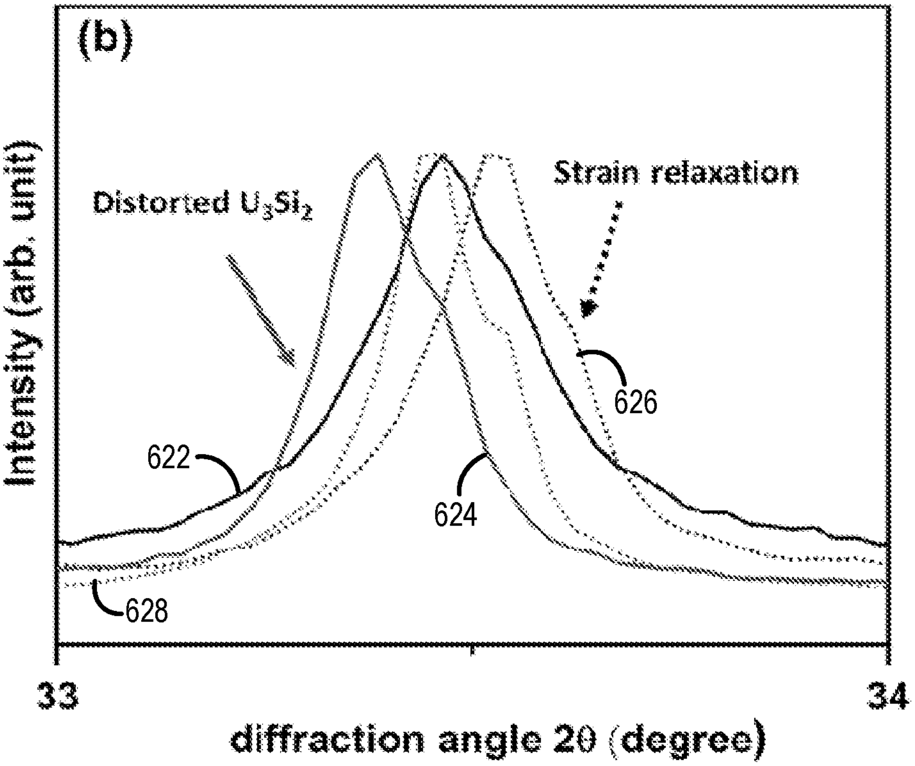
FIG. 6B illustrates XRD patterns of the SPS densified Al-doped mc-$U_3Si_2$ and annealed Al-doped mc-$U_3Si_2$ within diffraction angle 33 to 34 degrees.

FIG. 6A illustrates XRD patterns of the SPS densified Al-doped (1.8 at. % and 7.2 at. %) mc- and nc-$U_3Si_2$ pellets within diffraction angle 33~38 degrees and FIG. 6B illustrates XRD patterns of the SPS densified Al-doped mc-$U_3Si_2$ and annealed Al-doped mc-$U_3Si_2$ within diffraction angle 33 to 34 degrees. FIG. 6B includes intensity versus diffraction angle for SPS densified 1.8 at. % Al-doped mc-$U_3Si_2$ 622, SPS densified 7.2 at. % Al-doped mc-$U_3Si_2$ 624, annealed 1.8 at. % Al-doped mc-$U_3Si_2$ 626, and annealed 7.2 at. % Al-doped mc-$U_3Si_2$ 628. FIG. 6A shows the peak shift to the lower angle with increasing Al contents and nano-structure. The annealed Al-doped mc-$U_3Si_2$ was annealed at 300° C. for 2 hours in air. FIG. 6B shows strain relaxation and transition from a distorted phase to an ideal $U_3Si_2$.

FIG. 6A shows that for both mc- and nc-pellets, the XRD peaks of (201), (220), and (211) shifted to lower angles with increasing Al contents doped in $U_3Si_2$, indicating that the incorporation of Al in $U_3Si_2$ may result in a volume expansion of the structural lattice. The volume expansion and structural distortion become more obvious for the nc-$U_3Si_2$. The nanocrystalline pellets exhibit more XRD peak broadening than those present in the microcrystalline pellets. The lattice parameters of a and c-axes of the Al-doped $U_3Si_2$ may be derived based on the XRD peak positions. Table 1 includes calculated lattice parameters for Al doped in mc- and nc-$U_3Si_2$ after SPS.

TABLE 1

| | SPS | |
|---|---|---|
| Sample | a-axis [nm] | c-axis [nm] |
| $U_3Si_2$ | 0.723 | 0.390 |
| 1.8 at % Al + mc $U_3Si_2$ | 0.731 | 0.392 |
| 7.2 at % Al + mc $U_3Si_2$ | 0.733 | 0.392 |
| 25 at % Al + mc $U_3Si_2$ | 0.728 | 0.396 |
| 1.8 at % Al + nc $U_3Si_2$ | 0.730 | 0.394 |
| 7.2 at % Al + nc $U_3Si_2$ | 0.730 | 0.398 |
| 25 at % Al + mc $U_3Si_2$ | 0.726 | 0.395 |

Referring to Table 1, the lattice parameters of both a- and c-axes for un-doped $U_3Si_2$ are 0.723 nm and 0.390 nm, respectively. The lattice parameters of 1.8 at % Al-mc and 7.2 at % Al-mc $U_3Si_2$ are higher than these of un-doped $U_3Si_2$. The lattice expansion can be explained by the ionic size difference with Al incorporated in the lattice of $U_3Si_2$. The atomic radius of Al (0.118 nm) is larger than that of Si (0.111 nm). Al may substitute in Si sites based on their atomic size, and it is expected that the incorporation of larger sized Al in Si may lead to the lattice expansion proportionally if below its solubility. At higher Al contents to 25 at %, the lattice parameters remain nearly constant for both axes, similar to the 7.2 at % doped sample. It may be appreciated that both 7 and 25 at % Al doping exceed Al solubility limit in $U_3Si_2$, and thus the lattice parameters remain constant with maximum incorporation of Al in the structural lattice. The continuous increase in the lattice parameters for 1.8 to 7.2 at % suggested that not all of the Al in the 1.8 at % doping are incorporated into the structure lattice. Lattice expansions for the nc-$U_3Si_2$ pellets as compared with the mc-$U_3Si_2$ suggested that finer particle size and distribution promote the incorporation of Al into $U_3Si_2$ and possible reaction between the additives with fuel matrix.

Associated with lattice expansion with Al incorporation, lattice strain was also observed in the distorted $U_3Si_2$ structure which may be induced by SPS sintering. The as-fabricated Al-doped mc- and nc-$U_3Si_2$ pellets were annealed at 300° C. in air for 2 hours with a goal of forming $Al_2O_3$ as a protective layer in order to improve the oxidation resistance. XRD analysis (FIG. 6B) of the annealed pellets shows the shifting of the XRD peaks toward higher diffraction angles for both 1.8 at % and 7.2 at % doped mc-$U_3Si_2$, suggesting possible strain relaxation after annealing.

FIGS. 7A through 7D illustrate SEM images showing microstructure and distribution of Al additives: (FIG. 7A) 1.8 at % Al-doped mc-$U_3Si_2$; (FIG. 7B) 1.8 at % Al-doped nc-$U_3Si_2$; and (FIG. 7C) 7.2 at % Al-doped mc-$U_3Si_2$; and (FIG. 7D) 7.2 at % Al-doped nc-$U_3Si_2$ after SPS sintering. It may be appreciated that the Al-enriched additives showing bright contrasts are homogeneously distributed in the silicide fuel matrix.

Figure 7A:
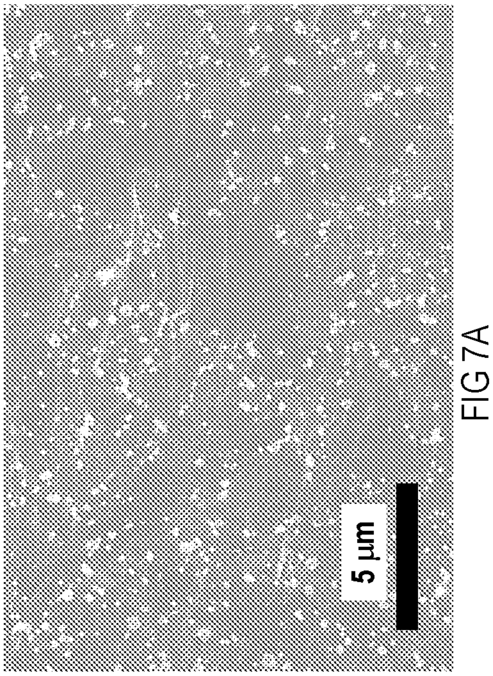
FIGS. 7A through 7D illustrate SEM images showing microstructure and distribution of Al additives: 1.8 at % Al-doped mc-$U_3Si_2$; 1.8 at % Al-doped nc-$U_3Si_2$; and 7.2 at % Al-doped mc-$U_3Si_2$; and 7.2 at % Al-doped nc-$U_3Si_2$ after SPS sintering.
Figure 7B:
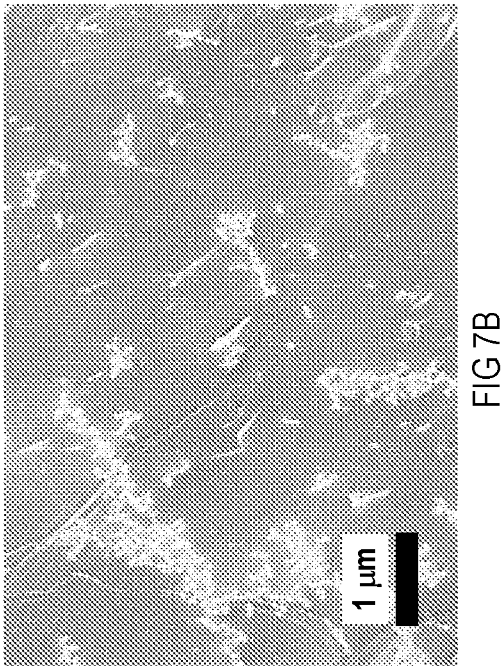
Figure 7C:
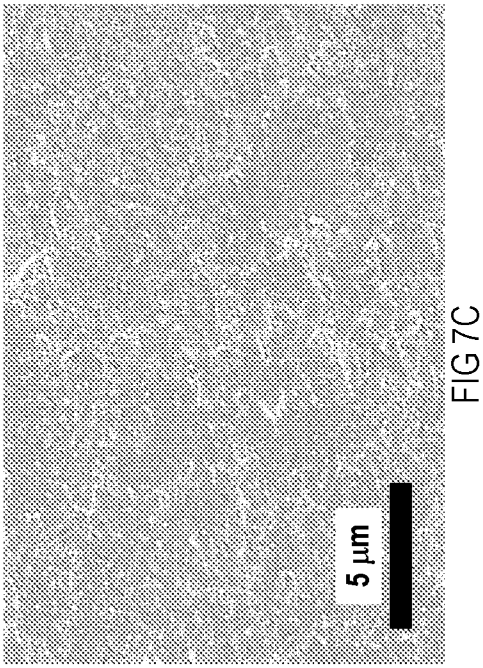
Figure 7D:
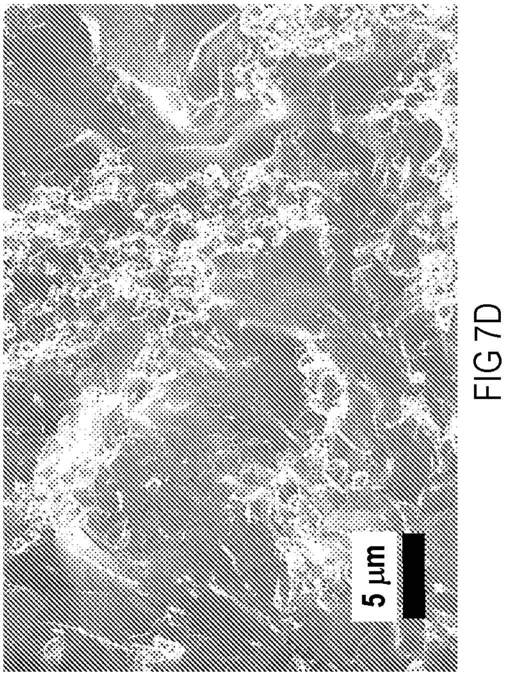

Morphology and microstructure of the SPS densified Al-doped $U_3Si_2$ pellets were characterized by SEM on fractured surfaces as shown in FIGS. 7A through 7D. The average grains sizes of mc-$U_3Si_2$ and nc-$U_3Si_2$ are estimated as ~6 μm and ~600 nm, respectively. Numerous particles showing a bright contrast can be identified uniformly distributed through the matrix of the mc-$U_3Si_2$ for both 1.8 at % and 7.2 at % Al-doped pellets. The secondary phases observed in 1.8 at % Al-doped pellet may indicate that not all of the Al are incorporated into the lattice of the $U_3Si_2$. A similar phenomena can also be observed in the Al-doped nc-$U_3Si_2$ as shown in FIGS. 7B and 7D. The particle sizes showing bright contrasts in mc and nc-$U_3Si_2$ are ~380 nm and 120 nm, respectively, and the refinement of the Al additive may be a result of ball milling at longer milling cycles.

Figure 8A:
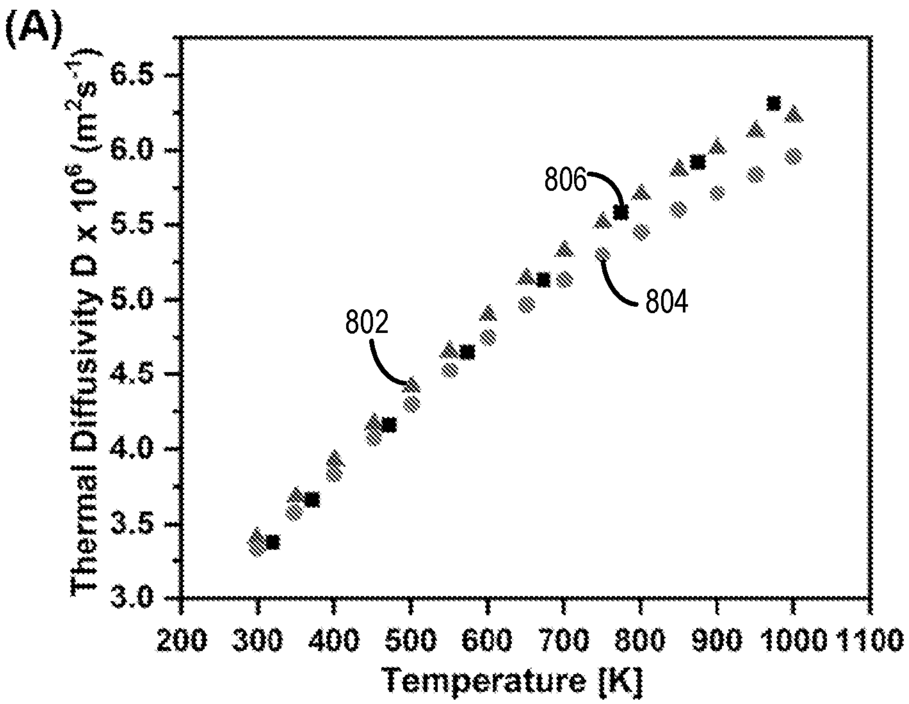
FIGS. 8A and 8B are plots illustrating measured thermal diffusivity and calculated thermal conductivity in the range of 300 to 1000 K for mc-samples and nc-samples.
Figure 8B:
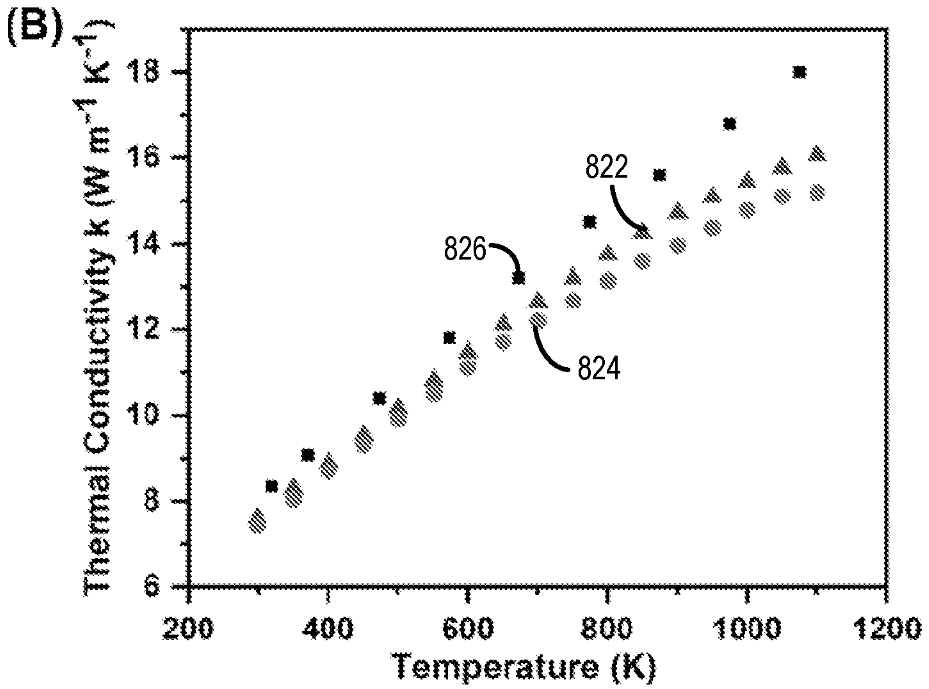

FIGS. 8A and 8B are plots illustrating measured thermal diffusivity (FIG. 8A) and calculated thermal conductivity (FIG. 8B) in the range of 300 to 1000 K for mc-samples 802, 822, nc-samples 804, 824 and reported data 806, 826. It can be seen that the measured thermal diffusivity matches relatively well with the reported literature data. It may be appreciated that thermal conductivity of $U_3Si_2$ increases with temperature. The relatively higher thermal conductivity of silicide indicates better efficiency in terms of heat release, especially at elevated temperatures, which can mitigate thermal stress and alleviate stress induced fuel cracking.

Figure 9A:
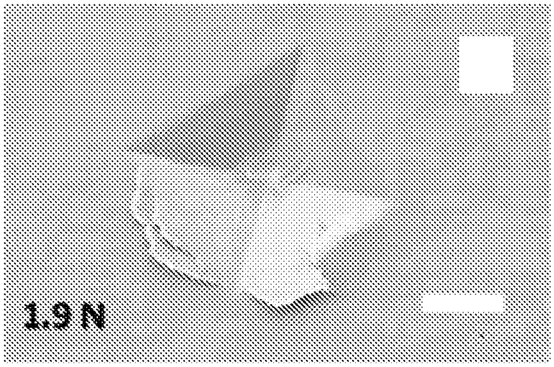
FIGS. 9A through 9C illustrate SEM images showing nano-indentation and micro-indentation and the associated crack propagation.
Figure 9B:
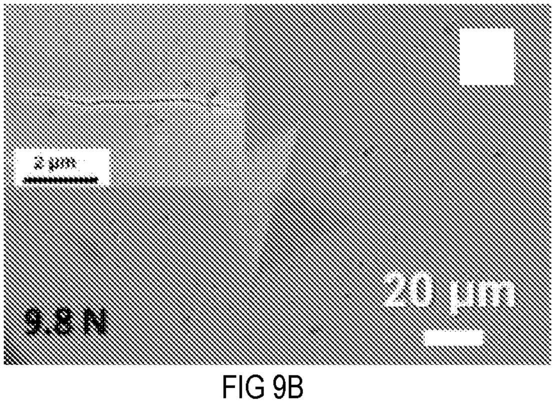
Figure 9C:
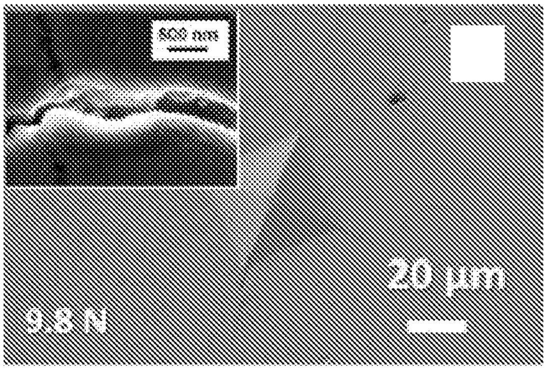

FIGS. 9A through 9C illustrate SEM images showing nano-indentation (FIG. 9A, 1.9 N) and micro-indentation (FIG. 9B, 9.8 N) and the associated crack propagation (FIG. 9C). FIG. 9A illustrates plastic deformation in mc-specimen. FIG. 9A illustrates trans-granular fracture in mc-specimen. FIG. 9C illustrates inter-granular fracture in nc-specimen.

The SPS densified $U_3Si_2$ pellets display better mechanical behavior with simultaneously improved strength and fracture toughness.

In general, the hardness of the sintered $U_3Si_2$ pellets is within the range of 5.5~7.5 Gpa, varying with different sintering conditions and measurement conditions (mechanical loading). Hardness of nc-specimen is found to be higher than mc-specimen. This can be explained by Hall-Petch effect, which describes the strength and improvement in hardness through grain refinement. In terms of hardness, Hall-Petch can be expressed as equation (6), where H is hardness of the material, $H_0$ is the single crystal hardness, $k_H$ is a parameter describing the stress intensity, and D is the grain size.

$$H = H_0 + \frac{k_H}{D^{1/2}} \tag{6}$$

The mechanism of Hall-Petch effect is that the increased grain boundaries through grain refinement lead to the misalignment and complexity of grain boundaries and the pile-up and the accumulation of dislocations at grain boundaries, which can impede the movement of dislocations.

The nc-specimen has a lower fracture toughness compared to the mc-specimen, which might be induced by a greater residual strain induced from SPS sintering. The fracture toughness of the SPS densified pellets is within the range of 3.0-3.5 Mpa $m^{1/2}$. The relatively high fracture toughness of the SPS densified pellet is illustrated in the SEM image (FIG. 9A) in which materials clearly experience plastic deformation under the indentation of 1.9 N loading, suggesting that the SPS densified is actually ductile. The enhanced fracture toughness may benefit the fuel-pellet cladding interaction during fuel operation.

Different cracking propagation mechanisms were observed for mc- and nc-specimen under high mechanical loading of 9.8 N. As shown in the FIGS. 9B and 9C, the fracture mode of coarse-grain mc-specimen is trans-granular while that of finer-grain nc-specimen is inter-granular. The fracture toughness of nc-specimen is slightly lower than mc-specimen within experimental margin, which might be induced by the residual strain induced from the sintering process.

In another example, the hardness and fracture toughness of SPS densified Al-doped $U_3Si_2$ mc- and nc-samples were evaluated. For the 1.8 at % Al doped mc-$U_3Si_2$, the hardness was 9.07 MPa, and the hardness of the 7.2 at % Al-doped mc-$U_3Si_2$ was 8.26 MPa. For the 1.8 at % Al doped and 7.2 at % Al doped nc-$U_3Si_2$, the hardness was 8.06 and 7.62 MPa, respectively. It may be appreciated that the Al-doped $U_3Si_2$ becomes stronger as evaluated by their hardness as a result of a solution strengthening effect. The strengthening effect becomes weaker with higher Al doping and smaller grain structures. The reduction of hardness for 7.2 at % Al-doped specimens may also be associated with the formation of multiple binary and ternary phases. In another example, the fracture toughness of the 1.8 at % Al-doped mc-$U_3Si_2$ and nc-$U_3Si_2$ are higher than those of un-doped $U_3Si_2$, mc-$U_3Si_2$, and nc-$U_3Si_2$. In this example, the highest fracture toughness of 4.4 MPa $m^{1/2}$ occurred for 7.2 at % Al-doped nc-$U_3Si_2$. The relatively high fracture toughness of Al-doped $U_3Si_2$ compared to un-doped $U_3Si_2$ may be attributed to mismatch of lattice thermal expansion between $U_3Si_2$ and Al, and the volume expansion of Al additives and the oxide scale may apply a compressive stress on $U_3Si_2$ matrix, enhancing the capability against crack formation and propagation.

Figure 10A:
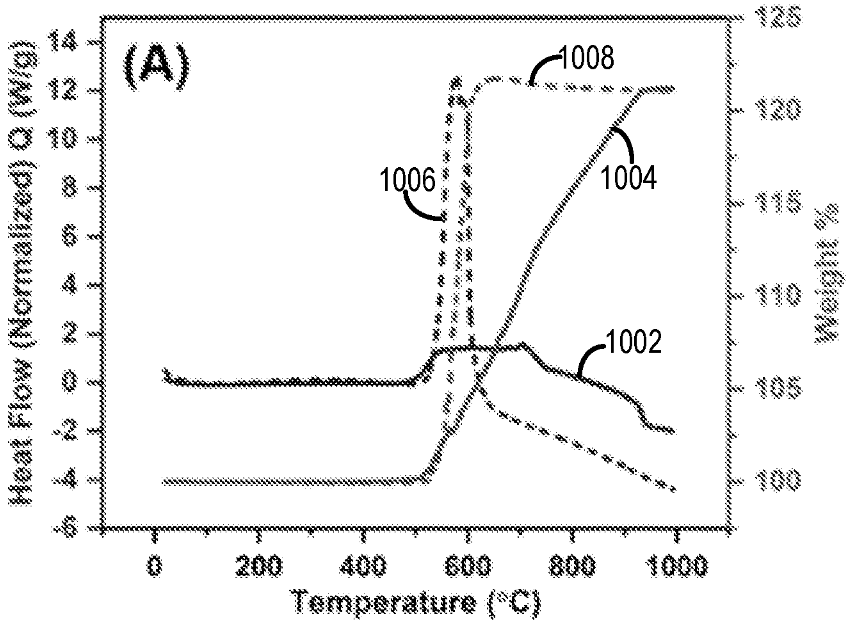
FIGS. 10A through 10E illustrate oxidation performance of the SPS-sintered $U_3Si_2$ pellets by TGA measurement for mc- and nc-specimens prior to and after thermal annealing.
Figure 10B:
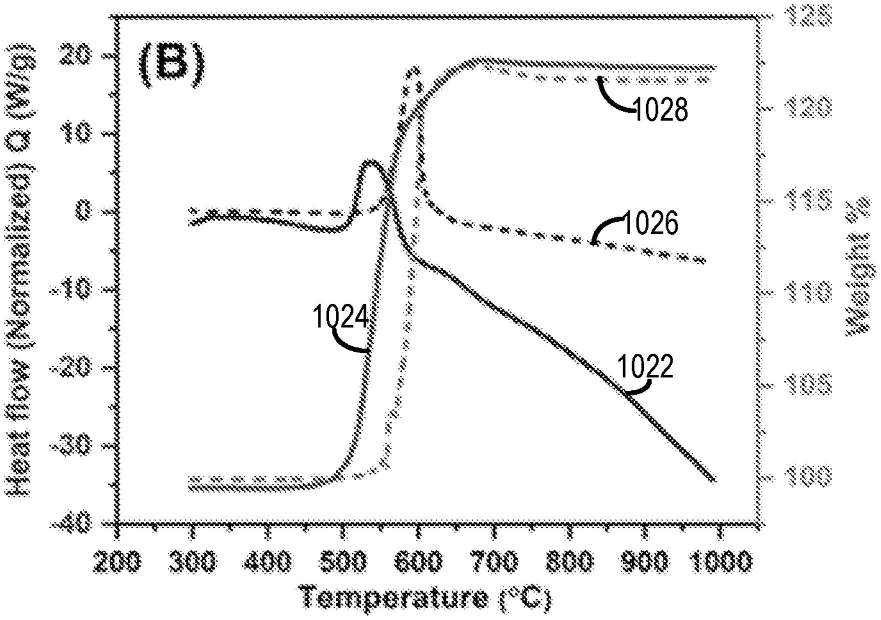
Figure 10C:
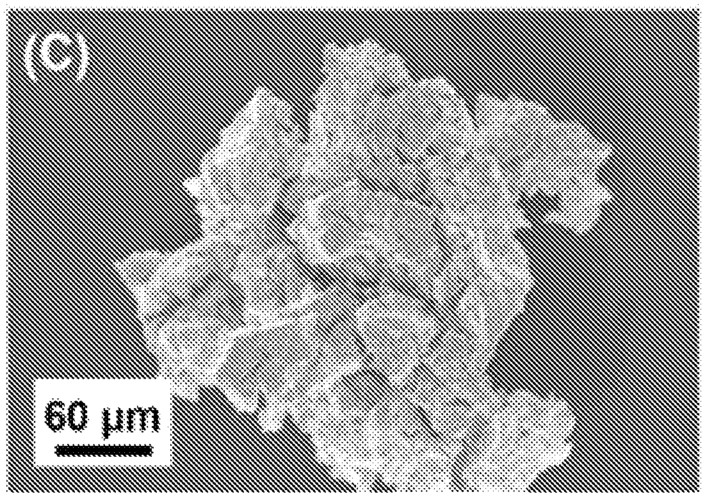
Figure 10D:
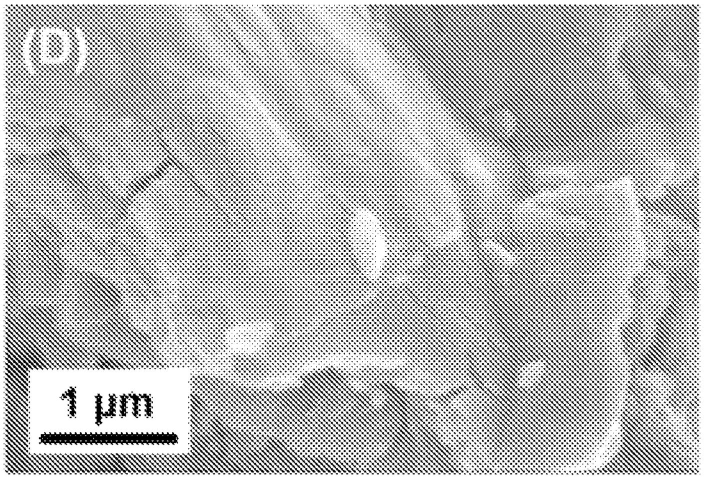
Figure 10E:
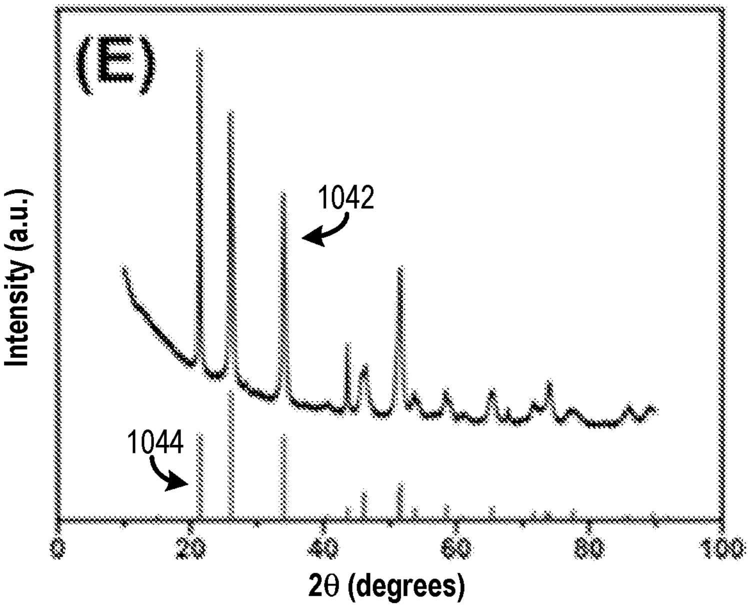

FIGS. 10A through 10E illustrate oxidation performance of the SPS-sintered $U_3Si_2$ pellets by TGA measurement for mc- and nc-specimens prior to (FIG. 10A) and after (FIG. 10B) thermal annealing at 300° C. for 120 minutes. FIGS. 10C and 10D illustrate SEM images and FIG. 10E illustrates an XRD pattern of the TGA product 1042, indicating that a majority of the oxidation product is $U_3O_8$ 1044.

The SPS densified $U_3Si_2$ pellets demonstrate a relatively extended onset temperature for oxidation and relatively reduced oxidation rates, particularly for nano-sized pellets. The oxidation behavior including onset temperature, oxidation rate, and the terminal oxidation are determined by dynamic TGA testing with a ramp of 10° C./min up to 1000° C. The heat flow and weight gain may be continuously measured as shown in FIGS. 10A and 10B. FIG. 10A illustrates heat flow versus temperature for the mc-specimen 1002 and the nc-specimen 1006 and weight percentage versus temperature for the mc-specimen 1004 and the nc-specimen 1008. FIG. 10B illustrates heat flow versus temperature for the mc-specimen 1022 and the nc-specimen 1026 and weight percentage versus temperature for the mc-specimen 1024 and the nc-specimen 1028.

Table 2 includes a summary of oxidation parameters for mc- and nc-$U_3Si_2$ where "prior" and "after" refer to thermal annealing. The mc-specimen and nc-specimen have similar onset temperature of ~510° C.

TABLE 2

| Sample | Onset Temperature (° C.) | Time to full oxidation (min) | Terminal Oxidation (%) |
|---|---|---|---|
| mc-prior | 520 | 12 | 21.2 |
| nc-prior | 510 | 42 | 21.1 |
| mc-after | 560 | 9 | 21.6 |
| nc-after | 500 | 17 | 22.4 |

The nc-specimen exhibits improved oxidation resistance with reduced oxidation kinetics. In this example, it took 42 minutes to achieve saturated oxidation for nc-pellets and 12 minutes for mc-specimens. The reduced oxidation kinetics are evident from the heat flow, in which a rapidly-risen heat flow peak is identified for mc-specimen, suggesting a rapid oxidation and vigorous heat release as a result of exothermic reaction of $U_3Si_2$. In contrast, a plateau of the heat flow can be identified for nc-specimen, indicating a slow heat release as a result of mild oxidation reaction. The oxidation of dense nc-$U_3Si_2$ completes almost beyond 950° C. at a ramping rate of 10° C./min. The enhanced oxidation resistance of nc-$U_3Si_2$ can be attributed to the strain effects in dense silicide matrix during the SPS. In nc-pellets, compressive strains are identified as evidenced by the X-ray diffraction and Rietveld refinement, retarding the oxidation process of silicide. The strain effect on the oxidation behavior is consistent with previous observation for air oxidation of Si, in which even a small amount of strain will lead to an intensive change to the oxidation process.

After annealing, the onset temperature of nc-specimen slightly decreased while mc-specimen increased. The time to full oxidation of mc-specimen is slightly shortened from 12 to 9 minutes while that of nc-specimen reduces from 42 to 17 minutes. After annealing, mc-specimen and nc-specimen display similar oxidation rate. Neither specimen reaches the theoretical max weight gain, which is ~25%. The comparison between the TGA result prior and after annealing indicates that strain appears to have an impact on the oxidation resistance of $U_3Si_2$. The relaxation of tensile strain in micron-sized silicide reduces the oxidation rate; while the relaxation of the compressive strain in nano-sized $U_3Si_2$ results in the degradation of the oxidation performance. These results highlight a potential opportunity of developing oxidation resistant (potentially corrosion resistant) silicide fuels for accident tolerant fuels (ATF) by strain engineering and maintaining structural integrity. It is contemplated that the fuel-cladding mechanical interaction will exert compressive forces on the fuel matrix, potentially improving the oxidation resistance.

Figure 11A:
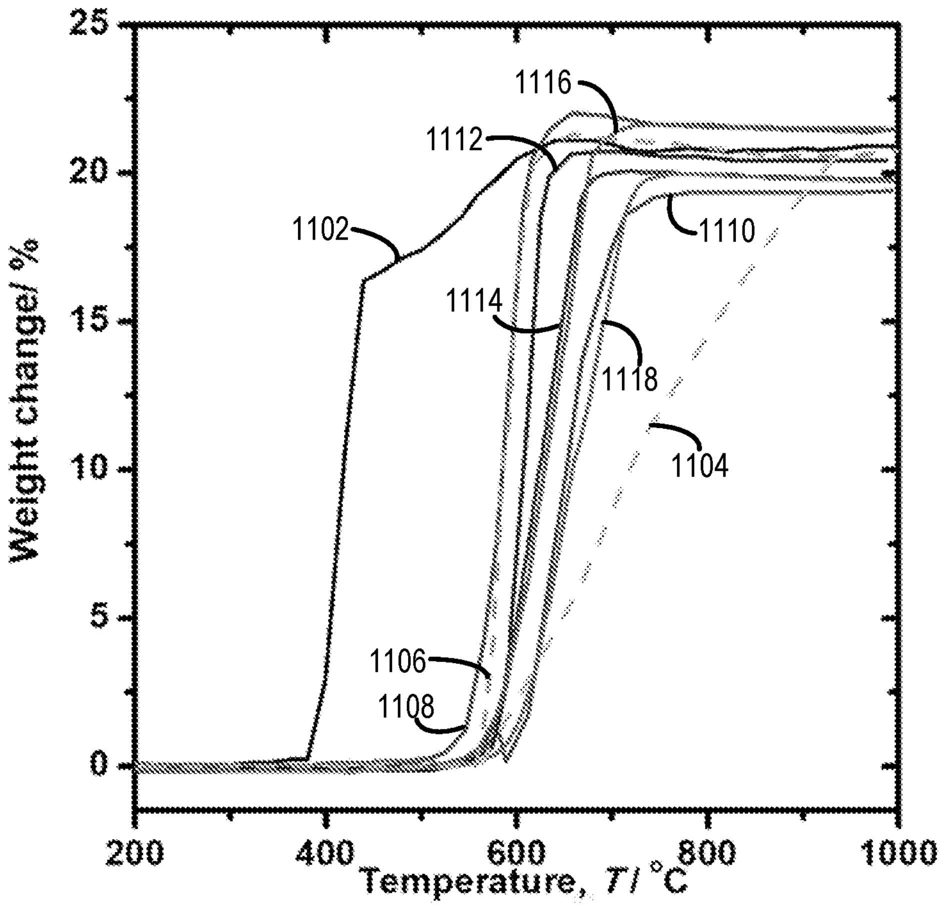
FIGS. 11A and 11B illustrate dynamic oxidation testing by TGA showing oxidation behavior of SPS densified Al-doped $U_3Si_2$ pellets as fabricated and after thermal annealing at 300° C. for 120 minutes in air.
Figure 11B:
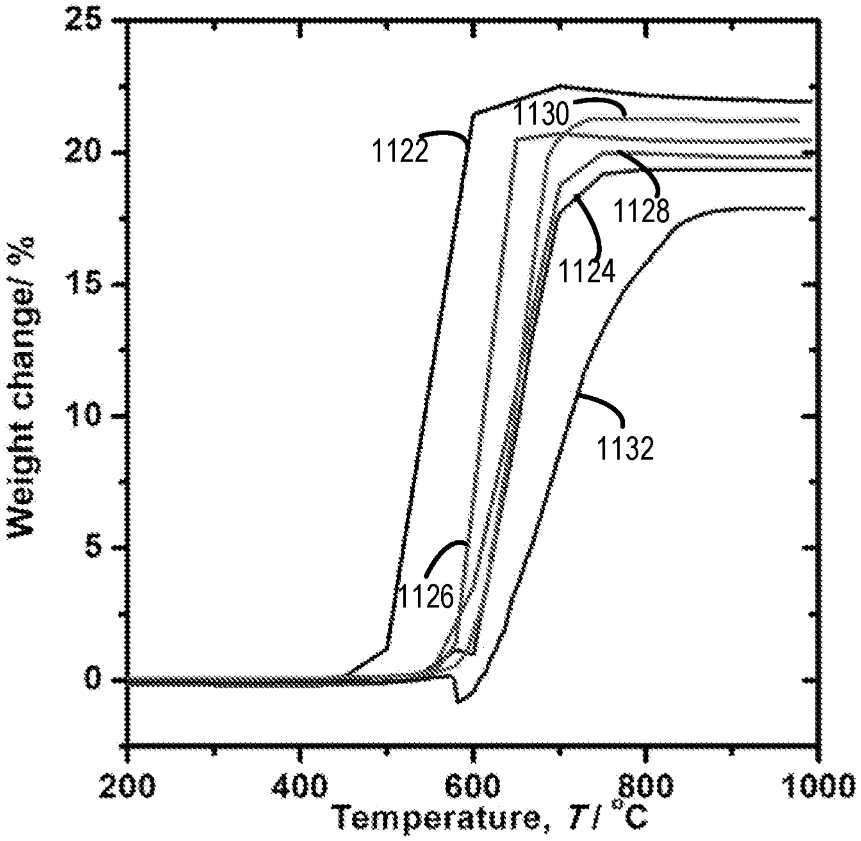

FIGS. 11A and 11B illustrate dynamic oxidation testing by TGA showing oxidation behavior of SPS densified Al-doped $U_3Si_2$ pellets as fabricated (FIG. 11A) and after thermal annealing (FIG. 11B) at 300° C. for 120 minutes in air. FIG. 11A includes oxidation curves (% weight change versus temperature) for as received nuclear fuel ($U_3Si_2$) 1102, nano $U_3Si_2$ 1104, micro (i.e., micron) $U_3Si_2$ 1106, 1.8 at. % Al doped micro $U_3Si_2$ 1108, 1.8 at. % Al doped nano $U_3Si_2$ 1110, 7.2 at. % Al doped micro $U_3Si_2$ 1112, 7.2 at. % Al doped nano $U_3Si_2$ 1114, 25 at. % Al doped micro $U_3Si_2$ 1116, and 25 at. % Al doped nano $U_3Si_2$ 1118 (all prior to annealing). FIG. 11B includes oxidation curves for 1.8 at. % Al doped micro $U_3Si_2$ 1122, 1.8 at. % Al doped nano $U_3Si_2$ 1124, 7.2 at. % Al doped micro $U_3Si_2$ 1126, 7.2 at. % Al doped nano $U_3Si_2$ 1128, 25 at. % Al doped micro $U_3Si_2$ 1130, and 25 at. % Al doped nano $U_3Si_2$ 1132 (after annealing).

The SPS densified Al-doped $U_3Si_2$ pellets with both micron- and nano-sized grain structures show improved oxidation resistance as compared with monolithic and un-doped $U_3Si_2$. FIG. 11A shows the dynamic oxidation behavior of the silicide pellets by a power ramping by a TGA/DSC with a heat rate of 10° C./min up to 1000° C., and the weight change and heat flow were recorded as a function of temperature. Pure monolithic $U_3Si_2$ pellets prepared by arc melting and the SPS-densified monolithic mc- and nc-$U_3Si_2$ are plotted together in the FIG. 11A for comparison. The onset temperatures of SPS densified Al-doped $U_3Si_2$ pellets are generally above 550° C. The onset temperature for 7.2 at % Al addition in mc-$U_3Si_2$ is approximately 580° C. The terminal weight gain reaches about 20~21 wt %, suggesting that full oxidation occurred with most of uranium oxidized into $U_3O_8$. The highest onset oxidation temperature was observed for 25 at % Al-doping above 600° C. The relatively high Al additive (i.e., 25 at % Al) may reduce the fissile element density below that of $UO_2$.

To further improve the oxidation resistance of the SPS densified Al-doped pellets, isothermal annealing was performed in air at 300° C. for 2 hours configured to form $Al_2O_3$ as a protective oxide scale. It is expected no significant oxidation will occur for fuel matrix as the isothermal annealing was performed at a temperature well below the onset temperature of the fuel as measured by dynamic oxidation testing. After annealing, the onset temperature of 1.8 at % doped Al+nc $U_3Si_2$ is higher than 1.8 at % Al-doped mc $U_3Si_2$. Improvement in the onset temperature can be observed for a minimal Al addition with the onset temperature exceeding 600° C. for Al-doped nc-$U_3Si_2$.

Figure 12A:
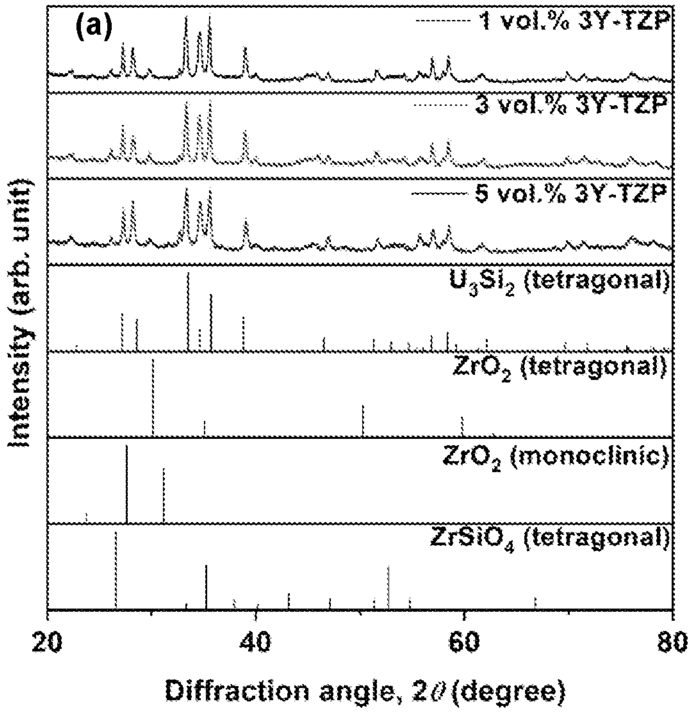
FIGS. 12A and 12B illustrate XRD patterns of the SPS-densified 3Y-TZP-doped $U_3Si_2$ composites with 1, 3 and 5 vol. % addition.
Figure 12B:
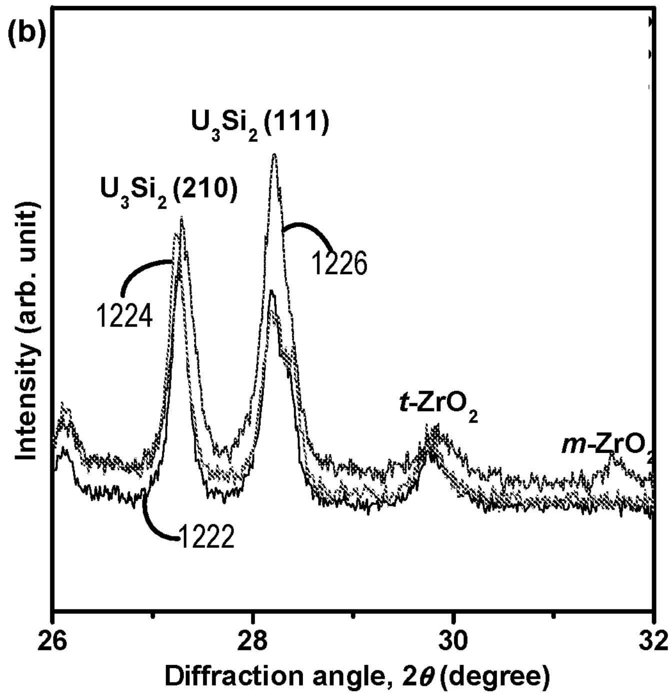

FIGS. 12A and 12B illustrate XRD patterns of the SPS-densified 3Y-TZP-doped $U_3Si_2$ composites with 1, 3 and 5 vol. % addition. FIG. 12A shows the XRD patterns of the SPS-densified composite pellets with the main peaks corresponding to tetragonal $U_3Si_2$ (P4/mbm-127), and minor secondary phases of $ZrO_2$ and $ZrSiO_4$. The zirconia phase displays a main diffraction peak located at 2θ ~30° and can be indexed to a tetragonal phase (t-$ZrO_2$, P42/nmc) for the 1~5 vol. % 3Y-TZP doped $U_3Si_2$ composites. The diffraction peaks at ~23° and 31.5° for the 5 vol. % 3Y-TZP doped $U_3Si_2$ can be indexed to a monoclinic phase (m-$ZrO_2$, $P2_1/c$). $ZrSiO_4$ phase can be indexed from diffraction peaks appearing at 26.6° and 35.2°. The tetragonal zirconia phase facilitates toughening the matrix resulting from the stress-induced t-m phase transformation induced during crack propagation. Thermodynamically, the monoclinic zirconia is a stable phase at room temperature with an average particle size of ~200 nm. FIG. 12B illustrates an enlarged view of the XRD patterns (1 vol. % 3Y-TZP 1222, 3 vol. % 3Y-TZP 1224 and 5 vol. % 3Y-TZP 1226) of FIG. 12A between 26~32° showing the existence of tetragonal zirconia in all specimens 1222, 1224, 1226 and monoclinic zirconia in the 5 vol. % composite 1226.

Figure 13A:
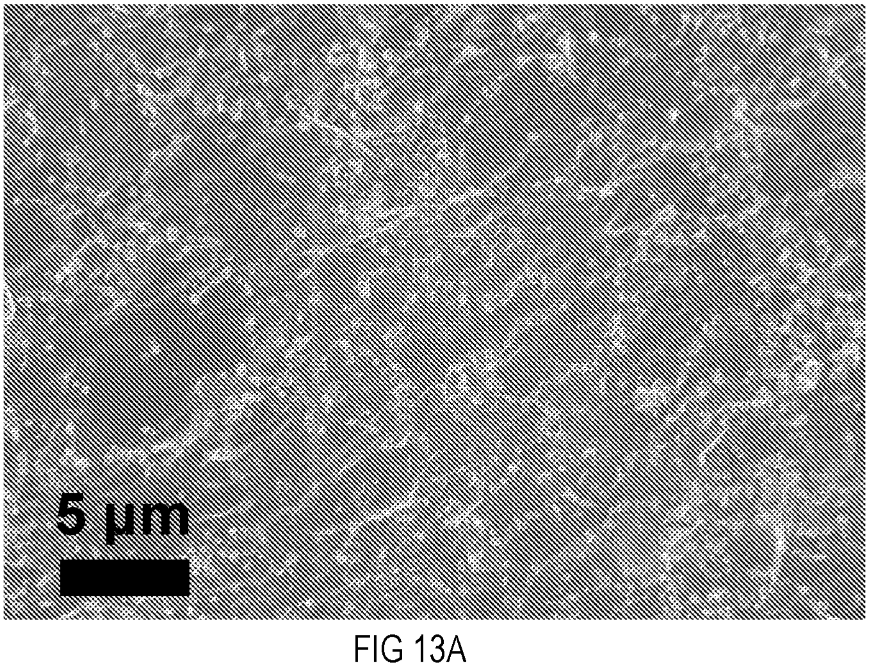
FIGS. 13A and 13B illustrate SEM images of the 5 vol. % 3Y-TZP doped $U_3Si_2$.
Figure 13B:
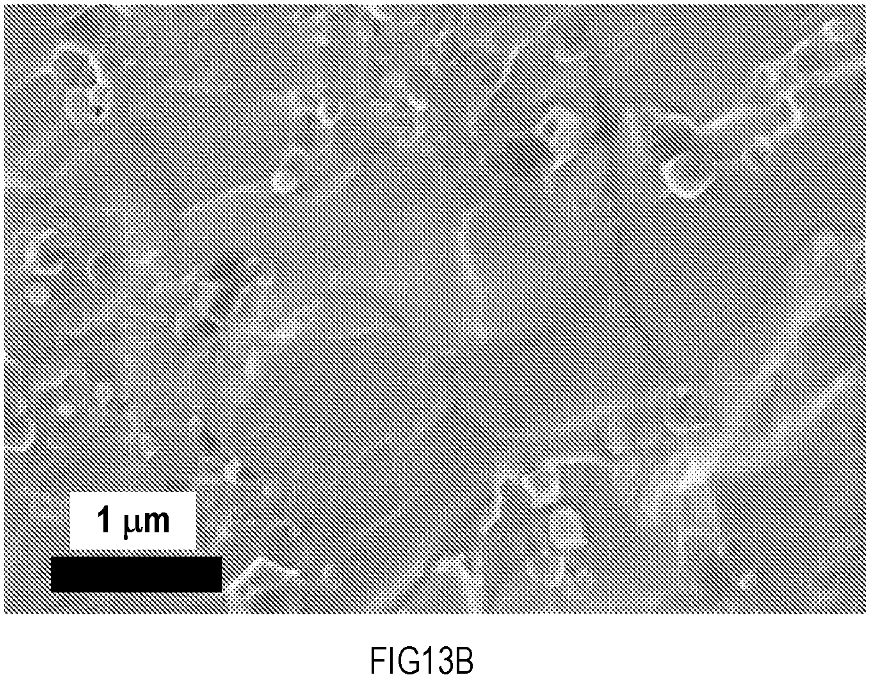

FIGS. 13A and 13B illustrate SEM images of the 5 vol. % 3Y-TZP doped $U_3Si_2$ composite (5 vol. % 3Y-TZP/$U_3Si_2$) showing the microstructure of nano-sized TZP additives in micron-sized fuel matrix and an uniform distribution of zirconia particles at the grain boundaries. The average grain size of $U_3Si_2$ as sintered at 1300° C. is ~2 μm, and particles showing bright contrast with an average sizes of ~200 nm are uniformly distributed through the matrix of the $U_3Si_2$. The powder metallurgy process including ball milling and SPS sintering play support the relatively uniform and homogenous distribution of Y-TZP additive in $U_3Si_2$.

The mechanical properties of the SPS-densified 3Y-TZP doped pellets were characterized by nano-indentation. The hardness, $H_V$, and the fracture toughness, $K_{1C}$, were determined based on the loading, the length of the indentation diagonal length, and Young's modulus. Micro-cracks could be generated through the 3Y-TZP particles. It is contemplated that the stress-induced t-m phase transformation associated with the micro-crack propagation may be responsible for the enhancement of the fracture toughness.

The micro-hardness and fracture toughness of the 3Y-TZP toughened $U_3Si_2$ matrix as a function of the 3Y-TZP content (volume %) was analyzed. In general, $U_3Si_2$ is a hard material, and the micro-hardness of un-doped $U_3Si_2$ pellets was reported to be 6.85 GPa. With the addition of 1 vol. % 3Y-TZP, the hardness is increased to 8.71 MPa. Increasing 3Y-TZP content in $U_3Si_2$ reduces the hardness of $U_3Si_2$, particularly for the 5 vol. % 3Y-TZP doped composite. Generally, the transformation from tetragonal to monoclinic phases is accompanied by the formation of micro-cracks due to the mismatch of TEC between 3Y-TZP and $U_3Si_2$, reducing the hardness of the prepared composites.

The addition of 3Y-TZP increases the fracture toughness for the SPS-densified $U_3Si_2$ pellets, and a monotonic increase can be observed with increasing volume of the additive. The maximum $K_{1C}$ was 4.04 MPa $m^{1/2}$ for the 5 vol. % 3Y-TZP doped composite. The fracture toughness of the 3 vol. %3Y-TZP/$U_3Si_2$ composite was 3.82 MPa $m^{1/2}$. It is contemplated that this may be attributed to the phase transformation of t-$ZrO_2$ to m-$ZrO_2$ and micro-cracking leading to the improvement of the $U_3Si_2$ toughness. The cracks were deflected, starting at the edge of the indentation by a 3Y-TZP particle locating at the grain boundary, thus increasing the $K_{1C}$. The SPS-densified 3Y-TZP doped composite pellets outperform pure $U_3Si_2$ pellets fabricated by conventional vacuum sintering. The combination of the SPS sintering and phase transformation-induced toughening mechanism enables the development of simultaneously mechanically-strong and tough $U_3Si_2$ composites with an outstanding resistance to crack generation.

It may be appreciated that the addition of the 3Y-TZP additives does not degrade the thermal transport properties of the fuel matrix due, at least in part, to the limited content. Typically, the thermal conductivities of 3Y-TZP doped $U_3Si_2$ composite fuels shows an increasing trend with temperature. This is consistent with the metallic behavior in which electron transport dominates thermal conductivity. Only a slight reduction in thermal conductivity was observed at high temperatures with the incorporation of 3Y-TZP due to its low thermal conductivity. Despite the reduction of thermal conductivities of $U_3Si_2$ with the addition of 3Y-TZP, the 3Y-TZP/$U_3Si_2$ composites displayed relatively higher thermal conductivity compared to monolithic $UO_2$ and $UO_2$/$U_3Si_2$ composites.

Figure 14A:
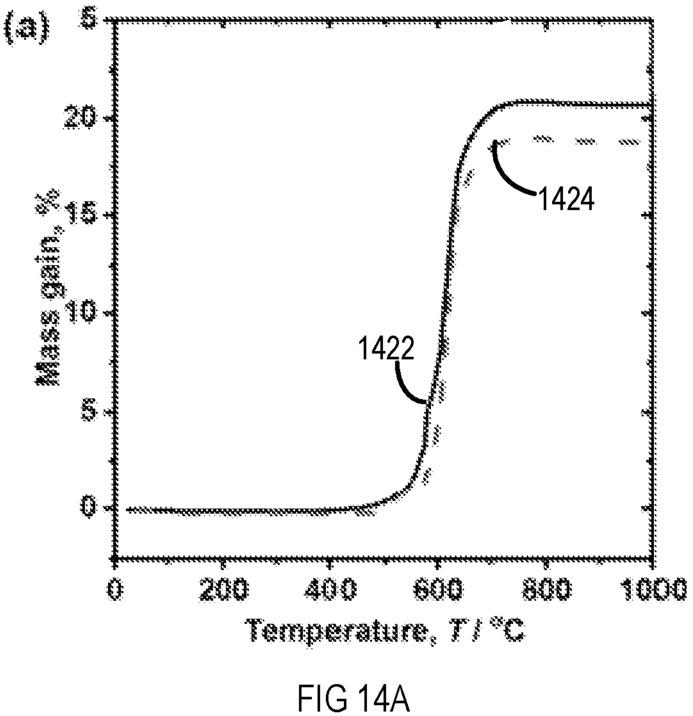
FIGS. 14A through 14C illustrate oxidation behavior of the SPS-densified and thermal annealing of 3Y-TZP/$U_3Si_2$ for 1 vol. %, 3 vol. %, and 5 vol. % 3Y-TZP, respectively.
Figure 14B:
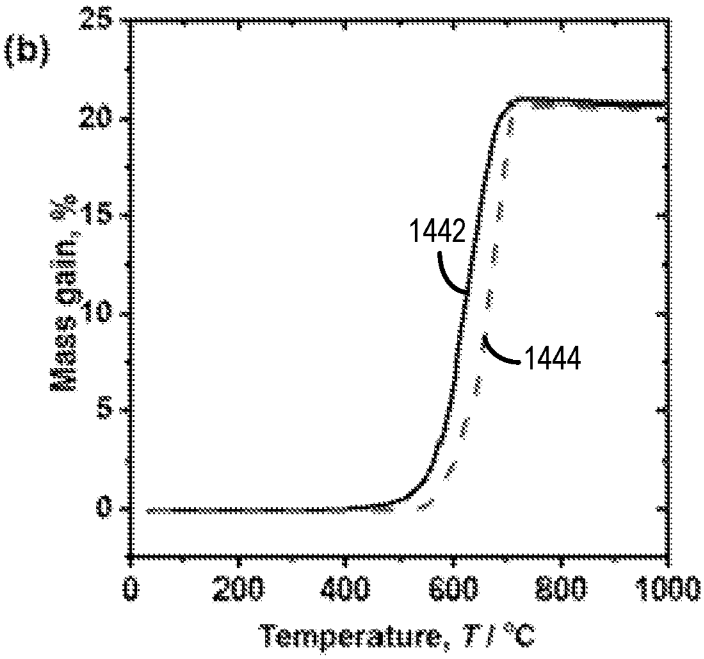
Figure 14C:
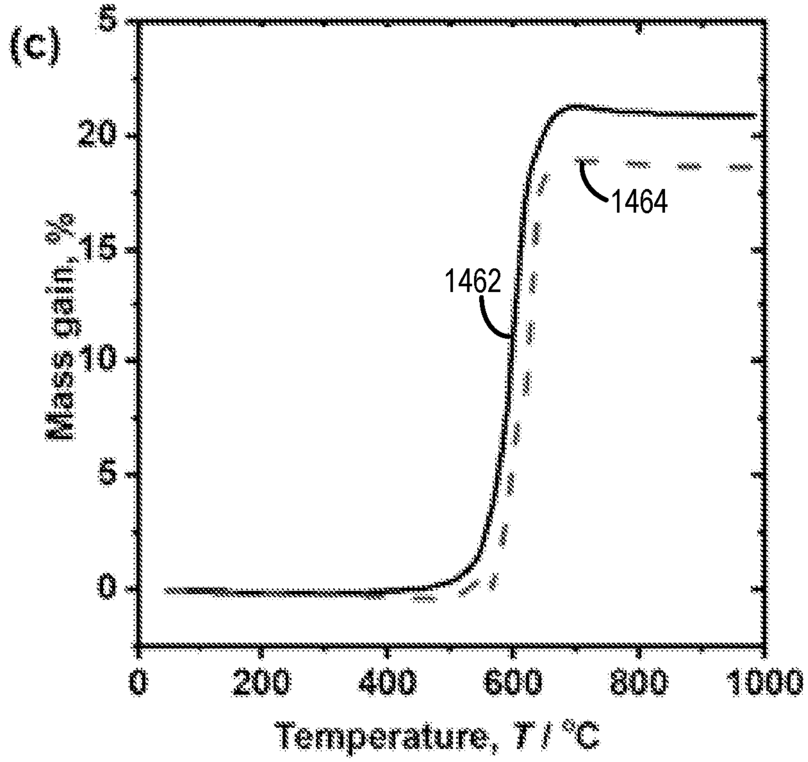

FIGS. 14A through 14C illustrate oxidation behavior of the SPS-densified and thermal annealing of 3Y-TZP/$U_3Si_2$ for 1 vol. %, 3 vol. %, and 5 vol. % 3Y-TZP, respectively. FIGS. 14A through 14C are plots of mass gain (%) versus temperature. FIG. 14A includes mass gain (%) curves for 1 vol. % 3Y-TZP after SPS sintering 1422 and for 1 vol. % 3Y-TZP after annealing 1424. FIG. 14B includes mass gain (%) curves for 3 vol. % 3Y-TZP after SPS sintering 1442 and for 3 vol. % 3Y-TZP after annealing 1444. FIG. 14C includes mass gain (%) curves for 5 vol. % 3Y-TZP after SPS sintering 1462 and for 5 vol. % 3Y-TZP after annealing 1464. The 3Y-TZP toughened $U_3Si_2$ composite fuels show improved oxidation resistance and structural integrity. FIGS. 14A through 14C illustrate dynamic oxidation behavior as measured by TGA in air, as evaluated by the temperature dependence of the weight change of 3Y-TZP doped $U_3Si_2$ composites after SPS sintering. The calculated onset temperature and weight change from FIGS. 14A through 14C are summarized in Table 3.

TABLE 3

| | As-fabricated | | Thermal Annealing (in air, 300° C., 2 hrs) | |
|---|---|---|---|---|
| Samples | Onset Temperature/ ° C. | Weight change % | Onset Temperature/ ° C. | Weight change % |
| 1 vol. % 3Y-TZP | 574.5 | 20.8 | 592.7 | 18.8 |
| 3 vol. % 3Y-TZP | 566.4 | 20.8 | 617.0 | 20.6 |
| 5 vol. % 3Y-TZP | 565.1 | 20.9 | 600.2 | 18.6 |

The onset temperatures of the SPS densified 3Y-TZP doped $U_3Si_2$ composites are in general above 560° C. The 3Y-TZP doped specimens display a relatively higher onset temperature of oxidation.

The oxidation resistance test was performed on the composite fuels upon post-sintering thermal annealing. In general, post-thermal annealing increases the onset temperature and thus enhances materials oxidation resistance as compared with the as-fabricated pellets without annealing. The onset temperature of the composite fuels can be further improved to 617° C. for the 3 vol. % 3Y-TZP doped $U_3Si_2$ composite. The as-fabricated 3Y-TZP $U_3Si_2$ composites by SPS and annealed specimens show relatively superior oxidation resistance.

SUMMARY

Generally, this disclosure relates to an oxidation and corrosion resistant nuclear fuel and a method of making. Improvement of oxidation resistance and corrosion resistance nuclear fuels (e.g., $U_3Si_2$, UN) facilitates the use of $U_3Si_2$ and/or UN as accident tolerant fuels.

In one example, Al-doped nuclear composite fuels with controlled microstructure were fabricated by sintering, displaying improved oxidation resistance as compared with monolithic and Al-doped silicides prepared through standard powder metallurgy or arc melting. An addition of 1.8 at % Al is effective to increase the onset oxidation temperature of as-fabricated $U_3Si_2$ pellets to 550° C., which can be further improved to 575-580° C. at greater Al addition (7.2 at %). Post-sintering thermal annealing was applied to form passive alumina oxide and further increase the onset temperature of the 1.8 at % Al doped nano-sized $U_3Si_2$ pellet to 610° C. The Al-doped $U_3Si_2$ composite fuels display simultaneously higher hardness and fracture toughness than un-doped $U_3Si_2$. These results highlight an effective strategy by integrating minimal Al additives, microstructure control and post-thermal annealing to design advanced silicide fuels with improved oxidation resistance, desired thermal-mechanical properties and while maintaining a relatively high fissile element density.

In another example, microstructure control, oxide protection and phase transformation-induced mechanical toughening were utilized in the fabrication of $U_3Si_2$ fuels. 3Y-TZP additives are uniformly distributed into the SPS-densified $U_3Si_2$ fuel matrix, enhancing materials fracture toughness up to 4.04 MPa $m^{1/2}$. The 3Y-TZP doped $U_3Si_2$ composite pellets show improved onset temperature of oxidation above 560° C., which can be further improved to 617° C. with 3 vol. % addition by post-sintering thermal annealing. The development of mechanically-tough and oxidation-resistant $U_3Si_2$ with minimized doped amount supports the use of high density $U_3Si_2$ as an accident tolerant fuel in a nuclear energy systems.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

What is claimed is:

1. A method of making an oxidation and corrosion resistant nuclear fuel, the method comprising:

refining, by high energy ball milling (HEBM), a nuclear fuel powder comprising at least one nuclear fuel component and a powdered dopant selected from the group consisting of aluminum (Al) and 3 mol % yttria-stabilized tetragonal polycrystal (3Y-TZP), the refined powder comprising the nuclear fuel powder and the powdered dopant;

and sintering the refined powder to form a nuclear fuel pellet.

2. The method of claim 1, further comprising annealing, by post-sintering thermal annealing, the nuclear fuel pellet.

3. The method according to claim 1, wherein the refining comprises loading a quantity of the powder and a number of balls into a ball milling jar and performing a number of HEBM cycles, the number of HEBM cycles performed related to a target size of the refined powder.

4. The method of claim 3, wherein the target grain size of the refined powder is in the range of one micrometer (μm) to 10 μm or in the range of 100 nanometers (nm) to 500 nm.

5. The method according to claim 1, wherein the sintering is selected from the group comprising spark plasma sintering (SPS), vacuum sintering, hot pressing, hot isostatic pressing (HIP).

6. The method according to claim 1, wherein the sintering corresponds to spark plasma sintering (SPS).

7. The method according to claim 1, wherein the nuclear fuel powder comprises Uranium and Silicon as triuranium disilicide (U3Si2).

8. The method according to claim 1, wherein the nuclear fuel powder comprises Uranium and Nitrogen as uranium nitride (UN).

9. The method of claim 1, wherein the powdered dopant comprises aluminum (Al), and an amount of the Al dopant is about 1.8 at. % (atomic percentage).

10. The method of claim 1, wherein the powdered dopant comprises 3 mol % yttria doped-tetragonal zirconia polycrystal (3Y-TZP), and the amount of the 3Y-TZP dopant is selected from the group comprising 1 vol. % 3Y-TZP, 3 vol. % 3Y-TZP, 5 vol. % 3Y-TZP, and in the range of about 5 vol. % 3Y-TZP doping up to about 17 vol. % 3Y-TZP doping.

11. The method of claim 1, wherein the powdered dopant comprises aluminum (Al) and the amount of the Al dopant is about 7.2 at. %.

12. The method of claim 1, wherein the powdered dopant comprises aluminum (Al) and the amount of the Al dopant is in the range of about 7 at. % to 25 at. %.

13. The method of claim 1, wherein the nuclear fuel pellet exhibits an onset oxidation temperature greater than 500° C. as measured by thermogravimetric analysis (TGA).

* * * * *